US009467470B2

(12) United States Patent
Bhargava et al.

(10) Patent No.: US 9,467,470 B2
(45) Date of Patent: *Oct. 11, 2016

(54) SYSTEM AND METHOD FOR LOCAL PROTECTION AGAINST MALICIOUS SOFTWARE

(71) Applicant: McAfee, Inc., Santa Clara, CA (US)

(72) Inventors: Rishi Bhargava, Cupertino, CA (US); David P. Reese, Jr., Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,509

(22) Filed: Dec. 26, 2014

(65) Prior Publication Data
US 2015/0180884 A1 Jun. 25, 2015

Related U.S. Application Data

(63) Continuation of application No. 12/844,892, filed on Jul. 28, 2010, now Pat. No. 8,925,101.

(51) Int. Cl.
H04L 29/06 (2006.01)
G06F 17/00 (2006.01)
G06F 21/54 (2013.01)
(Continued)

(52) U.S. Cl.
CPC ............ H04L 63/145 (2013.01); G06F 21/53 (2013.01); G06F 21/54 (2013.01); G06F 21/554 (2013.01); G06F 21/566 (2013.01); G06F 21/604 (2013.01); G06F 21/606 (2013.01); H04L 63/10 (2013.01); H04L 63/1416 (2013.01);
(Continued)

(58) Field of Classification Search
None
See application file for complete search history.

(56) References Cited

U.S. PATENT DOCUMENTS 4,688,169 A 8/1987 Joshi
4,982,430 A 1/1991 Frezza et al.
(Continued)

FOREIGN PATENT DOCUMENTS

CN 1383295 A 12/2002
CN 101147379 3/2008
(Continued)

OTHER PUBLICATIONS

USPTO Dec. 24, 2012 Nonfinal Office Action from U.S. Appl. No. 13/032,851.
(Continued)

Primary Examiner — Fatoumata Traore
(74) Attorney, Agent, or Firm — Patent Capital Group

(57) ABSTRACT

A method in one example implementation includes intercepting a network access attempt on a computing device and determining a software program file associated with the network access attempt. The method also includes evaluating a first criterion to determine whether the network access attempt is permitted and blocking the network access attempt if it is not permitted. The first criterion includes a trust status of the software program file. In specific embodiments, the trust status is defined as trusted if the software program file is included in a whitelist of trustworthy program files and untrusted if the software program file is not included in a whitelist. In more specific embodiments, the method includes blocking the network access attempt if the software program file has an untrusted status. In further embodiments, an event is logged if the software program file associated with the network access attempt has an untrusted status.

19 Claims, 11 Drawing Sheets

(51) Int. Cl.
*G06F 21/55* (2013.01)
*G06F 21/56* (2013.01)
*G06F 21/60* (2013.01)
*G06F 21/53* (2013.01)

(52) U.S. Cl.
CPC ............... *G06F2221/2101* (2013.01); *G06F 2221/2115* (2013.01); *G06F 2221/2141* (2013.01)

(56) References Cited

U.S. PATENT DOCUMENTS

| | | | |
|---|---|---|---|
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,873,086 A | 2/1999 | Fujii et al. | |
| 5,884,298 A | 3/1999 | Smith, II et al. | |
| 5,907,709 A | 5/1999 | Cantey et al. | |
| 5,907,860 A | 5/1999 | Garibay et al. | |
| 5,926,832 A | 7/1999 | Wing et al. | |
| 5,944,839 A | 8/1999 | Isenberg | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,182,142 B1 | 1/2001 | Win et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,321,267 B1 | 11/2001 | Donaldson | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,496,477 B1 | 12/2002 | Perkins et al. | |
| 6,587,877 B1 | 7/2003 | Douglis et al. | |
| 6,611,925 B1 | 8/2003 | Spear | |
| 6,658,645 B1 | 12/2003 | Akuta et al. | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,941,470 B1 | 9/2005 | Jooste | |
| 6,988,101 B2 | 1/2006 | Ham et al. | |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,054,930 B1 | 5/2006 | Cheriton | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,096,500 B2 | 8/2006 | Roberts et al. | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,340,684 B2 | 3/2008 | Ramamoorthy et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,360,097 B2 | 4/2008 | Rothstein | |
| 7,363,022 B2 | 4/2008 | Whelan et al. | |
| 7,370,360 B2 | 5/2008 | van der Made | |
| 7,385,938 B1 | 6/2008 | Beckett et al. | |
| 7,406,517 B2 | 7/2008 | Hunt et al. | |
| 7,441,265 B2 | 10/2008 | Staamann et al. | |
| 7,463,590 B2 | 12/2008 | Mualem et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,506,364 B2 | 3/2009 | Vayman | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 * | 8/2009 | Chebolu et al. | 726/26 |
| 7,603,552 B1 | 10/2009 | Sebes et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,694,150 B1 | 4/2010 | Kirby | |
| 7,698,744 B2 | 4/2010 | Fanton et al. | |
| 7,703,090 B2 | 4/2010 | Napier et al. | |
| 7,739,497 B1 | 6/2010 | Fink et al. | |
| 7,757,269 B1 | 7/2010 | Roy-Chowdhury et al. | |
| 7,765,538 B2 | 7/2010 | Zweifel et al. | |
| 7,783,735 B1 | 8/2010 | Sebes et al. | |
| 7,809,704 B2 | 10/2010 | Surendran et al. | |
| 7,814,554 B1 | 10/2010 | Ragner | |
| 7,818,377 B2 * | 10/2010 | Whitney et al. | 709/206 |
| 7,823,148 B2 | 10/2010 | Deshpande et al. | |
| 7,836,504 B2 | 11/2010 | Ray et al. | |
| 7,840,968 B1 | 11/2010 | Sharma et al. | |
| 7,849,507 B1 | 12/2010 | Bloch et al. | |
| 7,853,643 B1 | 12/2010 | Martinez et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,873,955 B1 | 1/2011 | Sebes et al. | |
| 7,895,573 B1 | 2/2011 | Bhargava et al. | |
| 7,908,653 B2 | 3/2011 | Brickell et al. | |
| 7,925,722 B1 | 4/2011 | Reed et al. | |
| 7,937,455 B2 | 5/2011 | Saha et al. | |
| 7,950,056 B1 | 5/2011 | Satish et al. | |
| 7,966,659 B1 | 6/2011 | Wilkinson et al. | |
| 7,996,836 B1 | 8/2011 | McCorkendale et al. | |
| 8,015,388 B1 | 9/2011 | Rihan et al. | |
| 8,015,563 B2 | 9/2011 | Araujo et al. | |
| 8,028,340 B2 | 9/2011 | Sebes et al. | |
| 8,055,904 B1 | 11/2011 | Cato et al. | |
| 8,195,931 B1 | 6/2012 | Sharma et al. | |
| 8,205,188 B2 | 6/2012 | Ramamoorthy et al. | |
| 8,209,680 B1 | 6/2012 | Le et al. | |
| 8,234,709 B2 | 7/2012 | Viljoen et al. | |
| 8,234,713 B2 | 7/2012 | Roy-Chowdhury et al. | |
| 8,307,437 B2 | 11/2012 | Sebes et al. | |
| 8,321,932 B2 | 11/2012 | Bhargava et al. | |
| 8,332,929 B1 | 12/2012 | Bhargava et al. | |
| 8,352,930 B1 | 1/2013 | Sebes et al. | |
| 8,381,284 B2 | 2/2013 | Dang et al. | |
| 8,387,046 B1 | 2/2013 | Montague et al. | |
| 8,515,075 B1 | 8/2013 | Saraf et al. | |

(56) References Cited

U.S. PATENT DOCUMENTS

| | | |
|---|---|---|
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 8,584,199 B1 | 11/2013 | Chen et al. |
| 8,701,182 B2 | 4/2014 | Bhargava et al. |
| 8,707,422 B2 | 4/2014 | Bhargava et al. |
| 8,707,446 B2 | 4/2014 | Roy-Chowdhury et al. |
| 8,713,668 B2 | 4/2014 | Cooper et al. |
| 8,739,272 B1 | 5/2014 | Cooper et al. |
| 8,762,928 B2 | 6/2014 | Sharma et al. |
| 8,763,118 B2 | 6/2014 | Sebes et al. |
| 8,793,489 B2 | 7/2014 | Polunin et al. |
| 8,800,024 B2 | 8/2014 | Cooper et al. |
| 8,843,903 B1 | 9/2014 | Blaser et al. |
| 8,869,265 B2 | 10/2014 | Dang et al. |
| 8,904,520 B1 | 12/2014 | Nachenberg et al. |
| 8,925,101 B2 | 12/2014 | Bhargava et al. |
| 8,938,800 B2 | 1/2015 | Bhargava et al. |
| 8,973,146 B2 | 3/2015 | Ramanan et al. |
| 9,112,830 B2 | 8/2015 | Cooper et al. |
| 9,134,998 B2 | 9/2015 | Roy-Chowdhury et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. |
| 2002/0114319 A1 | 8/2002 | Liu et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0061506 A1 | 3/2003 | Cooper et al. |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0088680 A1 | 5/2003 | Nachenberg et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0057454 A1 | 3/2004 | Hennegan et al. |
| 2004/0088398 A1 | 5/2004 | Barlow |
| 2004/0139206 A1 | 7/2004 | Claudatos et al. |
| 2004/0143749 A1 | 7/2004 | Tajali et al. |
| 2004/0153650 A1 | 8/2004 | Hillmer |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0022014 A1 | 1/2005 | Shipman |
| 2005/0071633 A1 | 3/2005 | Rothstein |
| 2005/0086047 A1 | 4/2005 | Uchimoto et al. |
| 2005/0091321 A1 | 4/2005 | Daniell et al. |
| 2005/0091487 A1 | 4/2005 | Cross et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0256907 A1 | 11/2005 | Novik et al. |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075299 A1 | 4/2006 | Chandramouleeswaran et al. |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1* | 2/2007 | Brennan .................... 726/24 |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0297333 A1 | 12/2007 | Zuk et al. |
| 2007/0297396 A1 | 12/2007 | Eldar et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0059123 A1 | 3/2008 | Estberg et al. |
| 2008/0082662 A1 | 4/2008 | Dandliker et al. |
| 2008/0082977 A1 | 4/2008 | Araujo et al. |
| 2008/0086513 A1 | 4/2008 | O'Brien |
| 2008/0115012 A1 | 5/2008 | Jann et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0295173 A1 | 11/2008 | Tsvetanov |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |

(56) References Cited

U.S. PATENT DOCUMENTS

| | | |
|---|---|---|
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0178110 A1 | 7/2009 | Higuchi |
| 2009/0220080 A1 | 9/2009 | Herne et al. |
| 2009/0249053 A1 | 10/2009 | Zimmer et al. |
| 2009/0249438 A1 | 10/2009 | Litvin et al. |
| 2009/0320010 A1 | 12/2009 | Chow et al. |
| 2009/0320133 A1 | 12/2009 | Viljoen et al. |
| 2009/0320140 A1 | 12/2009 | Sebes et al. |
| 2009/0328144 A1 | 12/2009 | Sherlock et al. |
| 2009/0328185 A1 | 12/2009 | van den Berg et al. |
| 2010/0049973 A1 | 2/2010 | Chen |
| 2010/0071035 A1 | 3/2010 | Budko et al. |
| 2010/0100970 A1 | 4/2010 | Roy-Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0299277 A1 | 11/2010 | Emelo et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0061092 A1 | 3/2011 | Bailloeul et al. |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0246753 A1 | 10/2011 | Thomas |
| 2011/0302647 A1 | 12/2011 | Bhattacharya et al. |
| 2012/0030750 A1 | 2/2012 | Bhargava et al. |
| 2012/0110666 A1 | 5/2012 | Ogilvie |
| 2012/0159631 A1 | 6/2012 | Niemela et al. |
| 2012/0216271 A1 | 8/2012 | Cooper et al. |
| 2012/0233611 A1 | 9/2012 | Voccio |
| 2012/0278853 A1 | 11/2012 | Roy-Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0179971 A1 | 7/2013 | Harrison |
| 2013/0227683 A1 | 8/2013 | Bettini et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247201 A1 | 9/2013 | Alperovitch et al. |
| 2013/0247226 A1 | 9/2013 | Sebes et al. |
| 2013/0268994 A1 | 10/2013 | Cooper et al. |
| 2014/0090061 A1 | 3/2014 | Avasarala et al. |
| 2014/0101783 A1 | 4/2014 | Bhargava et al. |
| 2014/0189859 A1 | 7/2014 | Ramanan et al. |
| 2014/0237584 A1 | 8/2014 | Cooper et al. |
| 2014/0250492 A1 | 9/2014 | Cooper et al. |
| 2014/0283065 A1 | 9/2014 | Teddy et al. |
| 2014/0283066 A1 | 9/2014 | Teddy et al. |
| 2014/0317592 A1 | 10/2014 | Roy-Chowdhury et al. |
| 2014/0351895 A1 | 11/2014 | Bhargava et al. |
| 2015/0121449 A1 | 4/2015 | Cp |
| 2015/0180997 A1 | 6/2015 | Ramanan et al. |
| 2015/0200968 A1 | 7/2015 | Bhargava et al. |
| 2015/0365380 A1 | 12/2015 | Cooper et al. |

FOREIGN PATENT DOCUMENTS

| | | |
|---|---|---|
| CN | 101218568 A | 7/2008 |
| CN | 101569129 | 10/2009 |
| CN | 101636998 A | 1/2010 |
| CN | 103283202 A | 9/2013 |
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| JP | 2005-275839 | 6/2005 |
| JP | 2005-202523 | 7/2005 |
| JP | 2006-59217 | 3/2006 |
| JP | 2006-302292 | 11/2006 |
| JP | 2007-500396 | 1/2007 |
| JP | 2008-506303 | 2/2008 |
| JP | 2008-217306 | 9/2008 |
| JP | 2009-510858 | 3/2009 |
| JP | 2010-16834 | 1/2010 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |
| WO | WO 2008/054997 A2 | 5/2008 |
| WO | WO 2011/003958 A1 | 1/2011 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |
| WO | WO 2014/105308 A1 | 7/2014 |
| WO | WO 2015/060857 A1 | 4/2015 |

OTHER PUBLICATIONS

USPTO Jul. 16, 2013 Final Office Action from U.S. Appl. No. 13/032,851.
USPTO Feb. 28, 2013 Nonfinal Office Action from U.S. Appl. No. 13/275,249.
International Search Report and Written Opinion, International Application No. PCT/US2012/057312, mailed Jan. 31, 2013, 10 pages.
USPTO Mar. 1, 2013 Nonfinal Office Action from U.S. Appl. No. 13/275,196.
International Search Report and Written Opinion, International Application No. PCT/US2012/057153, mailed Dec. 26, 2012, 8 pages.
USPTO Mar. 1, 2013 Nonfinal Office Action from U.S. Appl. No. 13/437,900.
USPTO Sep. 13, 2013 Final Office Action from U.S. Appl. No. 13/275,249, 21 pages.
USPTO Oct. 2, 2013 Final Office Action from U.S. Appl. No. 13/275,196, 21 pages.
USPTO Oct. 4, 2013 Nonfinal Office Action from U.S. Appl. No. 12/844,892, 36 pages.
USPTO Oct. 25, 2013 Nonfinal Office Action from U.S. Appl. No. 12/844,964, 39 pages.
U.S. Appl. No. 14/045,208, filed Oct. 3, 2013, entitled "Execution Environment File Inventory," Inventors: Rishi Bhargava, et al., 33 pages.
USPTO Sep. 27, 2013, Notice of Allowance from U.S. Appl. No. 13/437,900, 12 pages.
PCT Application Serial No. PCT/US13/71327, filed Nov. 21, 2013, entitled "Herd Based Scan Avoidance System in a Network Environment,", 46 pages.

(56) References Cited

OTHER PUBLICATIONS

USPTO Dec. 4, 2013 Nonfinal Office Action from U.S. Appl. No. 13/032,851.
U.S. Appl. No. 14/127,395, entitled "Agent Assisted Malicious Application Blocking in a Network Environment," filed Dec. 18, 2013, Inventors: Chandan Cp et al., 76 pages.
USPTO Dec. 26, 2013 Notice of Allowance from U.S. Appl. No. 13/275,249, 32 pages.
USPTO Dec. 16, 2013 Notice of Allowance from U.S. Appl. No. 13/275,196, 11 pages.
USPTO Jan. 13, 2014 Notice of Allowance from U.S. Appl. No. 13/437,900, 30 pages.
Patent Examination Report No. 1, Australian Application No. 2011283164, mailed Jan. 14, 2014, 6 pages.
USPTO Mar. 24, 2014 Notice of Allowance from U.S. Appl. No. 13/275,196, 9 pages.
International Search Report and Written Opinion, International Application No. PCT/US2013/071327, mailed Mar. 7, 2014, 12 pages.
USPTO Apr. 15, 2014 Notice of Allowance from U.S. Appl. No. 12/844,892, 9 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.
International Preliminary Report on Patentability in International Application No. PCT/US2012/057312, mailed Apr. 22, 2014, 5 pages.
U.S. Appl. No. 14/263,164, entitled "System and Method for Redirected Firewall Discovery in a Network Environment," filed Apr. 28, 2014, Inventors: Geoffrey Cooper et al., 38 pages.
U.S. Appl. No. 14/277,954, entitled "System and Method for Interlocking a Host and a Gateway," filed May 15, 2014, Inventors: Geoffrey Cooper et al., 42 pages.
USPTO Jun. 6, 2014 Final Office Action from U.S. Appl. No. 12/844,964, 30 pages.
USPTO Jun. 4, 2014 Notice of Allowance from U.S. Appl. No. 13/032,851, 16 pages.
"Optical stateful security filtering approach based on code words," Sliti, M.; Boudriga, N., 2013 IEEE Symposium on Computers and Communications (ISCC), 10 pages.
Rothenberg, et al., "A Review of Policy-Based Resource and Admission Control Functions in Evolving Access and Next Generation Networks," Journal of Network and Systems Management, 16.1 (2008: 14-45, 32 pages.
USPTO Jun. 4, 2014 Nonfinal Office Action from U.S. Appl. No. 13/728,705, 16 pages.
Jun. 2, 2014 Office Action in Korean Patent Appln. No. 2013-7022241, [English translation], 6 pages.
USPTO Aug. 11, 2014 Notice of Allowance from U.S. Appl. No. 12/844,892, 8 pages.
USPTO Sep. 11, 2014 Notice of Allowance from U.S. Appl. No. 12/844,964, 10 pages.
USPTO Oct. 27, 2014 Notice of Allowance from U.S. Appl. No. 13/728,705, 25 pages.
Muttik, Igor, and Chris Barton, "Cloud security technologies," Information security technical report 14.1 (2009), 1-6, 6 pages.
Nov. 13, 2014 Office Action in Japanese Patent Application No. 2013-521770, English translation, 2 pages.
Patent Examination Report No. 1, Australian Application No. 2012220642, mailed Nov. 5, 2014, 3 pages.
Notice of Allowance received for Korean Patent Application No. 10-2013-7022241, mailed on Dec. 12, 2014, 3 pages.
Extended European Search Report in Application No. 12842144.3-1853/2769509 PCT/US2012/057312, mailed Feb. 6, 2015, 6 pages.
Notice of Reasons for Refusal in Japanese Patent Application No. JP 2013-521767, mailed on Feb. 17, 2015, 5 pages of English language translation, 4 pages of Japanese language Office Action.
U.S. Appl. No. 14/251,009, entitled "Method and Apparatus for Process Enforced Configuration Management," filed Apr. 11, 2014, Inventors: Rishi Bhargava et al., 37 pages.
U.S. Appl. No. 14/599,811, entitled "System and Method for Network Level Protection Against Malicious Software," filed Jan. 19, 2015, Inventors: Rishi Bhargava et al., 59 pages.
Feb. 27, 2015 Office Action in Japanese Patent Application No. 2013-521770, English translation, 3 pages.
Oct. 27, 2014 Office Action in EP Application No. 11 703 741.6-1870, 6 pages.
Feb. 28, 2015 Office Action in CN Application No. 2011800469004, English translation, 29 pages.
Mar. 23, 2015 Office Action in CN Application No. 201180046850X, English translation, 38 pages.
Apr. 20, 2015 Office Action in Japanese Patent Appln. No. 2013-555531, [English translation], 2 pages.
Cheneau, Tony, et al., "Significantly improved performances of the cryptographically generated addresses thanks to ECC and GPGPU," Computers & Security, vol. 29, No. 4, Jun. 2010, pp. 419-431, 13 pages.
USPTO Jul. 6, 2015 Nonfinal Rejection from U.S. Appl. No. 14/127,395, 32 pages.
USPTO Jul. 16, 2015 Corrected Notice of Allowability in U.S. Appl. No. 13/032,851, 3 pages.
USPTO Aug. 12, 2015 Nonfinal Rejection from U.S. Appl. No. 14/263,164, 33 pages.
U.S. Appl. No. 14/827,396, entitled "System and Method for Interlocking a Host and a Gateway," filed Aug. 17, 2015, Inventors: Geoffrey Howard Cooper et al., 30 pages.
USPTO Oct. 19, 2015 Notice of Allowance from U.S. Appl. No. 14/263,164, 13 pages.
Decision to Grant a Patent in Japanese Patent Application No. JP 2013-521767, mailed on Oct. 22, 2015, 3 pages of English language translation.
Sep. 8, 2015 Office Action in Japanese Patent Application No. 2013-555531, English translation, 2 pages.
USPTO Nov. 6, 2015 Nonfinal Rejection from U.S. Appl. No. 14/277,954, 32 pages.
USPTO Nov. 23, 2015 Nonfinal Rejection from U.S. Appl. No. 14/599,811, 27 pages.
Nov. 20, 2015 Office Action in CN Application No. 201180046850X, English translation, 36 pages.
Nov. 20, 2015 Office Action in CN Application No. 201280050877.0, English translation, 5 pages.
Nov. 13, 2015 Office Action in CN Application No. 201280010062.X, English translation, 5 pages.
USPTO Dec. 2, 2015 Notice of Allowance from U.S. Appl. No. 14/127,395, 7 pages.
Baba, Tatsuya, et al., "A Proposal of an Integrated Worm Countermeasure System Based on Dynamic VLAN Control," Journal of Information Processing Society of Japan, Japan, Information Processing Society of Japan, Aug. 15, 2006, vol. 47, No. 8, pp. 2449-2511, 14 pages, English language Abstract only.
Fujita, Keisuke, et al., "Proposal of DF system with boot control function against unauthorized programs," Transactions of Computer Security Symposium 2007, Japan, Information Processing Society of Japan, Oct. 31, 2007, vol. 2007, No. 10, pp. 501-506, 7 pages, English language Abstract only.
Ashiwa, Takashi, "IT Keyword too late to ask: Bot," Nikkei Computer, Japan, Nikkei Business Publications, Oct. 30, 2006, No. 664, pp. 244-249, 14 pages, 7 pages of English translation.
Mar. 2, 2015 Office Action in Korean Patent Appln. No. 2014-7021824, [English translation], 4 pages.
Apr. 29, 2015 Supplementary European Search Report in EP Application No. EP 12 84 1554, 7 pages.
International Preliminary Report on Patentability, International Application No. PCT/US2013/071327, mailed Jul. 9, 2015, 11 pages.
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

(56) References Cited

OTHER PUBLICATIONS

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
Barrantes et al., "Randomized Instruction Set Emulation to Disrupt Binary Code Injection Attacks," Oct. 27-31, 2003, ACM, pp. 281-289.
Gaurav et al., "Countering Code-Injection Attacks with Instruction-Set Randomization," Oct. 27-31, 2003, ACM, pp. 272-280.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
Kurt Gutzmann, "Access Control and Session Management in the HTTP Environment," Jan./Feb. 2001, pp. 26-35, IEEE Internet Computing.
"Apache Hadoop Project," http://hadoop.apache.org/, retrieved and printed Jan. 26, 2011, 3 pages.
"Cbl, composite blocking list," http://cbl.abuseat.org, retrieved and printed Jan. 26, 2011, 8 pages.
A Tutorial on Clustering Algorithms, retrieved Sep. 10, 2010 from http://home.dei.polimi.it/matteucc/clustering/tutorial.html, 6 pages.
A. Pitsillidis, K. Levchenko, C. Kreibich, C. Kanich, G.M. Voelker, V. Pason, N. Weaver, and S. Savage, "Botnet Judo: Fighting Spam with Itself," in Proceedings of the 17th Annual Network and Distributed System Security Symposium (NDSS'10), Feb. 2010, 19 pages.
A. Ramachandran, N. Feamster, and D. Dagon, "Revealing botnet membership using DNSBL counter-intelligence," in Proceedings of the 2nd USENIX Steps to Reducing Unwanted Traffic on the Internet, 2006, 6 pages.
A. Ramachandran, N. Feamster, and S. Vempala, "Filtering Spam with Behavioral Blacklisting," in *Proceedings of ACM Conference on Computer Communications Security*, 2007, 10 pages.
B. Stone-Gross, M. Cova, L. Cavallor, B. Gilbert, M. Szydlowski, R. Kemmerer, C. Kruegel, and G. Vigna, "Your Botnet is My Botnet: Analysis of a Botnet Takeover," in Proceedings of the 16th ACM Conference on Computer and Communications Security, 2009, 13 pages.
C. Kanich, C. Kreibich, K. Levchenko, B. Enright, G.M. Voelker, V. Paxson, and S. Savage, "Spamalytics: An Empirical Analysis of Spam Marketing Conversion," in Proceedings of the 15th ACM conference on Computer and Communications Security, 2008, 12 pages.
C.J. Burges, "A Tutorial on Support Vector Machines for Pattern Recognition," in *Journal of Data Mining and Knowledge Discovery*, 1998, 43 pages.
E-Mail Spamming Botnets: Signatures and Characteristics, Posted Sep. 22, 2008, http://www.protofilter.com/blog/email-spam-botnets-signatures.html, retrieved and printed Feb. 2, 2011, 4 pages.
G. Gu, J. Zhang, and W. Lee, "BotSniffer: Detecting Botnet Command and Control Channels in Network Traffic," in Proceedings of the 15th Annual Network and Distributed System Security Symposium (NDSS'08), Feb. 2008, 24 pages.
G. Gu, P. Porras, V. Yegneswaran, M. Fong, and W. Lee, "BotHunter: Detecting Malware Infection Through IDS-Driven Dialog Correlation," in Proceedings of the 16th USNIX Security Symposium, 2007, 34 pages.
G. Gu, R. Perdisci, J. Zhang, and W. Lee, "BotMiner: Clustering Analysis of Network Traffic for Protocol and Structure-Independent Botnet Detection," in Proceedings of the 17th USENIX Security Symposium, 2008, 15 pages.
I. Jolliffe, "Principal Component Analysis," in *Springer Series in Statistics, Statistical Theory and Methods, 2nd ed.*), 2002, 518 pages.
J. Dean and S. Ghemawat, "MapReduce: Simplified Data Processing on Large Clusters," in *Proceedings of Sixth Symposium on Operating System Design and Implementation, OSDI*, 2004, 13 pages.
J. Goebel and T. Holz, "Rishi: Identify Bot Contaminated Hosts by IRC Nickname Evaluation," in *Proceedings of the USENIX HotBots*, 2007, 12 pages.
J.B. Grizzard, V. Sharma, C. Nunnery, B.B. Kang, and D. Dagon, "Peer-to-Peer Botnets: Overview and Case Study," in Proceedings of the 1st Workshop on Hot Topics in Understanding Botnets, Apr. 2007, 14 pages.
J.P. John, A. Moshchuk, S.D. Gribble, and A. Krishnamurthy, "Studying Spamming Botnets Using Botlab," in Proceedings of the 6th UENIX Symposium on Networked Systems Design and Implementation, 2009, 16 pages.
K. Li, Z. Zhong, and L. Ramaswamy, "Privacy-Aware Collaborative Spam Filtering," in *Journal of IEEE Transactions on Parallel and Distributed Systems*, vol. 29, No. 5, May 2009, pp. 725-739.
L. Zhuang, J. Dunagan, D.R. Simon, H.J. Wang, and J.D. Tygar, "Characterizing botnets from email spam records," in Proceedings of the 1st Usenix Workshop on Large-Scale Exploits and Emergent Threats), 2008, 18 pages.
M. Frigo and S.G. Johnson, "The Design and Implementation of FFTW3," in Proceedings of the IEEE 93(2), Invited paper, Special Issue on Program Generation, Optimization, and Platform Adaptation, 2005, 16 pages.
R. Perdisci, I. Corona, D. Dagon, and W. Lee, "Detecting Malicious Flux Service Networks through Passive Analysis of Recursive DNS Traces," in Proceedings of the 25th Annual Computer Security Applications Conference (ACSAC 2009), Dec. 2009, 10 pages.
X. Jiang, D. Xu, and Y.-M. Wang, "Collapsar: A VM-Based Honeyfarm and Reverse Honeyfarm Architecture for Network Attack Capture and Detention," in Journal of Parallel and Distributed Computing, Special Issue on Security in Grid and Distributed Systems, 2006, 16 pages.
Y. Tang, S. Krasser, P. Judge, and Y.-Q. Zhang, "Fast and Effective Spam Sender Detection with Granular SVM on Highly Imbalanced Mail Server Behavior Data," in Proceedings of 2nd International Conference on Collaborative Computing: Networking, Applications and Worksharing (CollaborativeCom), Nov. 2006, 6 pages.
Y. Zhao, Y. Xie, F. Yu, Q. Ke, Y. Yu, Y. Chen, and E. Gillum, "BotGraph: Large Scale Spamming Botnet Detection," in Proceedings of the 6th USENIX Symposium on Networked Systems Design and Implementation, 2009, 26 pages.
Yinglian Xie, Fang Yu, Kannan Achan, Rina Panigraphy, Geoff Hulten, and Ivan Osipkov, "Spamming Botnets: Signatures and

(56) References Cited

OTHER PUBLICATIONS

Characteristics," SIGCOMM '08, Aug. 17, 22, 2008, http://ccr.sigcomm.org/online/files/p171-xie.pdf, pp. 171-182.
Z. Li, A. Goyal, Y. Chen, and V. Paxson, "Automating Analysis of Large-Scale Botnet probing Events," in Proceedings of ACM Symposium on Information, Computer and Communications Security (ASIACCS)), 2009, 12 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.1st.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. PCT/US2012/055674, 9 pages.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).

Office Action received for U.S. Appl. No. 12/844,892, mailed on Jan. 17, 2013, 29 pages.
Office Action received for U.S. Appl. No. 12/844,892, mailed on Sep. 6, 2012, 33 pages.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID=22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
International Search Report and Written Opinion, International Application No. PCT/US2012/026169, mailed Jun. 18, 2012, 11 pages.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, mailed Aug. 27, 2013, 8 pages.
PCT Application Serial No. PCT/US13/66690, filed Oct. 24, 2013, entitled "Agent Assisted Malicious Application Blocking in a Network Environment,", 67 pages.
Patent Examination Report No. 1, Australian Application No. 2011283160, mailed Oct. 30, 2013, 3 pages.
International Preliminary Report on Patentability in International Application No. PCT/US2012/057153, mailed Apr. 22, 2014, 4 pages.
International Search Report and Written Opinion in International Application No. PCT/US2013/066690, mailed Jul. 10, 2014, 12 pages.
Aug. 12, 2014 Office Action in Japanese Patent Application No. 2013-555531, English translation, 3 pages.
Office Action in CN 201180046900.4, mailed on Nov. 3, 2015, English translation, 29 pages.
U.S. Appl. No. 14/045,208, filed Oct. 3, 2013.
U.S. Appl. No. 14/848,522, filed Sep. 9, 2015.
U.S. Appl. No. 14/251,009, filed Apr. 11, 2014.
U.S. Appl. No. 12/291,232, filed Nov. 7, 2008.
U.S. Appl. No. 14/599,811, filed Jan. 19, 2015.
U.S. Appl. No. 13/229,502, filed Sep. 9, 2011.
U.S. Appl. No. 14/827,396, filed Aug. 17, 2015.
U.S. Appl. No. 14/263,164, filed Apr. 28, 2014.
U.S. Appl. No. 14/277,954, filed May 15, 2014.
U.S. Appl. No. 14/635,096, filed Mar. 2, 2015.
U.S. Appl. No. 14/127,395, filed Dec. 18, 2013.
USPTO Feb. 2, 2016 Notice of Allowance from U.S. Appl. No. 14/263,164, 10 pages.
USPTO Feb. 17, 2016 Nonfinal Rejection from U.S. Appl. No. 14/635,096, 17 pages.
Mar. 9, 2016 Office Action in CN Application No. 2011800469004, with English translation, 17 pages.
USPTO Apr. 5, 2016 Notice of Allowance from U.S. Appl. No. 14/277,954, 16 pages.
Apr. 8, 2016 Office Action in EP Application No. 11 710 915.7, 5 pages.

(56) References Cited

OTHER PUBLICATIONS

Feb. 25, 2016 Office Action in CN Application No. 201280053580.X, with English translation, 16 pages.
May 3, 2016 Office Action in CN Application No. 201180046850X, with English translation, 10 pages.
USPTO Jun. 6, 2016 Notice of Allowance from U.S. Appl. No. 14/127,395, 40 pages.
USPTO Jun. 6, 2016 Final Rejection from U.S. Appl. No. 14/599,811, 66 pages.

* cited by examiner

US 9,467,470 B2

SYSTEM AND METHOD FOR LOCAL PROTECTION AGAINST MALICIOUS SOFTWARE

RELATED U.S. APPLICATION INFORMATION

This Application is a continuation (and claims the benefit under 35 U.S.C. §120) of U.S. application Ser. No. 12/844,892, filed Jul. 28, 2010, entitled "SYSTEM AND METHOD FOR LOCAL PROTECTION AGAINST MALICIOUS SOFTWARE," Inventors Rishi Bhargava, et al. This application is related to co-pending U.S. patent application Ser. No. 12/844,964, filed Jul. 28, 2010, entitled "SYSTEM AND METHOD FOR NETWORK LEVEL PROTECTION AGAINST MALICIOUS SOFTWARE," Inventors Rishi Bhargava, et al. The disclosures of both of the prior applications are considered part of (and are incorporated by reference in) the disclosure of this application.

TECHNICAL FIELD

This disclosure relates in general to the field of network security and, more particularly, to local protection against malicious software.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious operators. Of particular concern more recently are botnets, which may be used for a wide variety of malicious purposes. Once a malicious software program file (e.g., a bot) has infected a host computer, a malicious operator may issue commands from a "command and control server" to control the bot. Bots can be instructed to perform any number of malicious actions such as, for example, sending out spam or malicious emails from the host computer, stealing sensitive information from a business or individual associated with the host computer, propagating the botnet to other host computers, and/or assisting with distributed denial of service attacks. In addition, the malicious operator can sell or otherwise give access to the botnets to other malicious operators through the command and control servers, thereby escalating the exploitation of the host computers. Consequently, botnets provide a powerful way for malicious operators to access other computers and to manipulate those computers for any number of malicious purposes. Security professionals need to develop innovative tools to combat such tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes intercepting a network access attempt on a computing device and determining a software program file associated with the network access attempt. The method also includes evaluating a first criterion to determine whether the network access attempt is permitted and blocking the network access attempt if it is not permitted. Finally, the first criterion includes a trust status of the software program file. In specific embodiments, the trust status is defined as trusted if the software program file is included in a whitelist identifying trustworthy software program files and untrusted if the software program file is not included in a whitelist. In more specific embodiments the network access attempt is blocked if the software program file has an untrusted status. In another more specific embodiment, the method further includes searching one or more whitelists to determine whether the software program file is identified in one of the whitelists. In other more specific embodiments, the method includes evaluating a second criterion to determine whether the second criterion overrides the first criterion with the second criterion including a network access policy for the software program file. In yet another embodiment, an event may be logged if the trust status of the software program file is defined as untrusted, and such logging may occur instead of blocking the network access attempt or may occur in addition to blocking the network access attempt.

Example Embodiments

Figure 1:
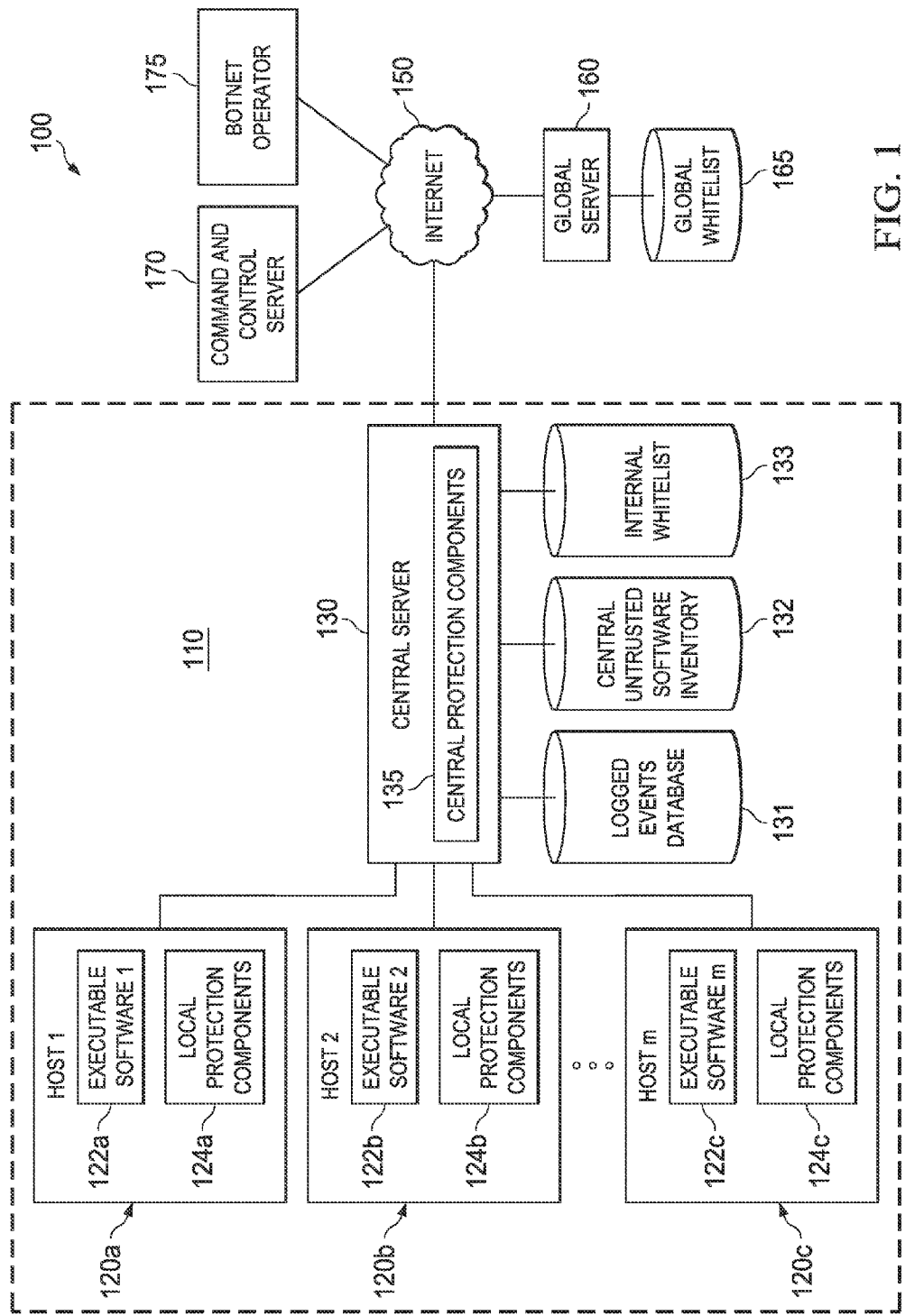
FIG. 1 is a pictorial representation of an exemplary network environment in which various embodiments of a system and method for local protection against malicious software may be implemented in accordance with the present disclosure.

FIG. 1 is a pictorial representation of an exemplary network environment 100 in which one embodiment of a system for local protection against malicious software may be implemented. Network environment 100 may include a local network 110 having a central server 130 and hosts 120a, 120b, and 120c with executable software 122a, 122b, and 122c, respectively. Local network 110 may be provided with electronic connection to other networks including, for example, wide area networks such as Internet 150. The Internet 150 provides access to many other networks, computing devices, and web services. For example, a global server 160 may provide a database 165 containing global whitelists indicating software program files that have been evaluated and determined to be free of malicious code. In addition, malicious users such as a botnet operator 175 may also have access to the Internet 150 along with a command and control server 170, which may be manipulated by botnet operator 175 to send out and subsequently control malicious software (e.g., a bot) that attempts to infect networks, such as local network 110. In one exemplary embodiment of the system for local protection against malicious software, local protection components 124a, 124b, and 124c may be installed in each host 120a, 120b, and 120c, respectively, and central protection components 135 may be installed in central server 130. Central server 130 may also have access to a logged events database 131, a central untrusted software inventory 132, and an internal whitelist 133.

In example embodiments, local protection components 124 on hosts 120 and central protection components 135 in central server 130 may cooperate to provide a system for local protection against malicious software. In one embodiment, each software program file in executable software 122a, 122b, and 122c of hosts 120a, 120b, and 120c, respectively, is evaluated to determine a trust status (i.e., trusted or untrusted) using one or more trust evaluation techniques (e.g., whitelist comparisons, program file change comparisons, blacklist comparisons, etc.). A central untrusted software inventory 132 may include entries identifying each program file that is categorized as untrusted, and this inventory may also be locally stored on corresponding hosts 120a, 120b, and 120c. In other embodiments, evaluation of software program files of executable software 122a, 122b, and 122c to determine a trust status is performed in real-time for program files associated with each network access attempt. A network access attempt as used herein in this Specification is intended to include any inbound or outbound network access attempt on a host (e.g., accepting a connection request, making a connection request, receiving electronic data from a network, sending electronic data to a network). When a software process on one of hosts 120a, 120b, or 120c is associated with a network access attempt, the network access may be blocked if a trust status of any of the program files associated with the software process is determined to be untrusted. In example embodiments, the trust status may be determined using one of the untrusted software inventories or may be determined using one or more trust evaluation techniques in real-time. Policies may also be used to define blocking rules for software processes associated with untrusted program files (e.g., only allow access to a specified subnet of network addresses, block all inbound and outbound network access attempts, block only inbound or outbound network access attempts, block all local network access attempts and allow Internet traffic, etc.) Any network access attempts by software processes associated with untrusted program files may also be logged and aggregated for reporting.

For purposes of illustrating the techniques of the system for local protection against malicious software, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications. In addition, it will be appreciated that the broad scope of this disclosure intends for references to "program file", "software program file", and "executable software" to encompass any software file comprising instructions that can be understood and processed on a computer such as, for example, executable files, library modules, object files, other executable modules, script files, interpreter files, and the like.

Typical network environments used in organizations and by individuals include the ability to communicate electronically with other networks using, for example, the Internet to access web pages hosted on servers connected to the Internet, to send or receive electronic mail (i.e., email) messages, or to exchange files with end users or servers connected to the Internet. Malicious users are continuously developing new tactics using the Internet to spread malware and to gain access to confidential information.

Tactics that represent an increasing threat to computer security often include botnets. Botnets use a client-server architecture where a type of malicious software (i.e., a bot) is placed on a host computer and communicates with a command and control server, which may be controlled by a malicious user (e.g., a botnet operator). The bot may receive commands from the command and control server to perform particular malicious activities and, accordingly, may execute such commands. The bot may also send any results or pilfered information back to the command and control server. In addition to receiving commands to perform malicious activities, bots also typically include one or more propagation vectors that enable it to spread within an organization's network or across other networks to other organizations or individuals. Common propagation vectors include exploiting known vulnerabilities on hosts within the local network and sending malicious emails having a malicious program attached or providing malicious links within the emails. Bots may also infect host computers through, for example, drive-by downloads, viruses, worms, Trojan horses, etc.

Botnets provide a powerful way for botnet operators to compromise computer systems by employing a variety of attacks. Once a bot has infected a host computer, the command and control server can issue commands to the bot to perform various types of attacks. Commonly, botnets have been used to send bulk email and to perform distributed denial of service attacks. More recently, however, botnets have been used to perform more targeted attacks against businesses and individuals to obtain confidential data or other sensitive information such as intellectual property and financial data.

Existing firewall and network intrusion prevention technologies are generally deficient in recognizing and containing botnets. Bots are often designed to initiate communication with the command and control server and to masquerade as normal web browser traffic. Bots may be crafted with a command and control protocol that makes the bot appear to be making normal outbound network connections to a web server. For example, a bot may use a port typically used to communicate with a web server. Such bots, therefore, may not be detected by existing technologies without performing more detailed packet inspection of the web traffic. Moreover, once a bot is discovered, the botnet operator may simply find another way to masquerade network access attempts by the bot to continue to present as normal web traffic. More recently, botnet operators have crafted bots to use encryption protocols such as, for example, secure socket layer (SSL), thereby encrypting malicious network access attempts. Such encrypted traffic may use a Hypertext Transfer Protocol Secure (HTTPS) port such that only the endpoints involved in the encrypted session can decrypt the data. Thus, existing firewalls and other network intrusion prevention technologies are unable to perform any meaningful inspection of the web traffic. Consequently, bots continue to infect host computers within networks.

Other software security technology focused on preventing unauthorized program files from executing on a host computer may have undesirable side effects for end users or employees of a business or other organizational entity. Network or Information Technology (IT) administrators may be charged with crafting extensive policies relevant to all facets of the business entity to enable employees to obtain software and other electronic data from desirable and trusted network resources. Without extensive policies in place, employees may be prevented from downloading software and other electronic data from network resources that are not specifically authorized, even if such software and other data are legitimate and necessary for business activities. In addition, such systems may be so restrictive that if unauthorized software is found on a host computer, any host computer activities may be suspended pending network administrator intervention. For businesses, this type of system may interfere with legitimate and necessary business activities, resulting in worker downtime, lost revenue, significant Information Technology (IT) overhead, and the like.

A system and method for local protection against malicious software, as outlined in FIG. 1, can reduce the propagation and malicious activities of botnets from infected networks, while allowing legitimate activities to continue within an infected network with less IT overhead being required. In accordance with one example implementation, a system is provided to proactively determine which software program files on each host within a network are a risk (i.e., untrusted). In one example, this determination is made by detecting unknown or changed program files residing on the hosts. Whenever a network access attempt (i.e., inbound or outbound) is made on one of the hosts within the network, a process associated with the network access attempt is evaluated to determine its corresponding program file or files, and the program file or files are evaluated to determine their trust statuses (i.e., trusted or untrusted). If each program file is trusted, then the network access attempt associated with the process may be allowed. However, if any of the program files are untrusted, then the network access attempt associated with the process may be blocked, thereby preventing the propagation and malicious activities of a possible bot. In one example embodiment, network access may be selectively permitted to and/or from a defined set of subnets, based on policy configurations. Thus, the ability of a bot to respond to commands from the command and control server and to propagate may be significantly diminished, while minimizing the interruption or prevention of necessary business activities. As a result, the system as implemented in FIG. 1 provides better protection to networks with an infected host and to other networks the infected host attempts to access.

Turning to the infrastructure of FIG. 1, local network 110 is representative of an example architecture in which the system for protecting computer systems may be implemented. Local network 110 may be configured in a variety of forms including, but not limited to, one or more local area networks (LANs), any other suitable network, or any combinations thereof. The Internet 150 is representative of a wide area network (WAN) to which local network 110 may be suitably connected. In one embodiment, local network 110 may be operably coupled to the Internet 150 by an Internet Service Provider (ISP) or through an Internet Server with dedicated bandwidth. The connection between local network 110 and the Internet 150 may include any appropriate medium such as, for example, digital subscriber lines (DSL), telephone lines, T1 lines, T3 lines, wireless, satellite, fiber optics, cable, Ethernet, etc. or any combination thereof. In addition, gateways, switches, routers and the like may be used to facilitate electronic communication between hosts 120 and central server 130 and the Internet 150. The ISP or Internet Server may be configured to allow hosts 120 to communicate with other nodes on the Internet using Transmission Control Protocol/Internet Protocol (TCP/IP) and a mail server (not shown) may allow hosts 120 to send and receive email messages using Simple Mail Transfer Protocol (SMTP).

In one example embodiment, local network 110 represents a network environment of an organization (e.g., a business, a school, a government entity, a family, etc.), with hosts 120a, 120b, and 120c representing end user computers operated by employees or other individuals associated with the organization. The end user computers may include computing devices such as desktops, laptops, mobile or handheld computing devices (e.g., personal digital assistants (PDAs) or mobile phones), or any other computing device capable of executing software processes associated with network access to local network 110. Connection between hosts 120a, 120b, and 120c, central server 130, and any additional components in local network 110 may include any appropriate medium such as, for example, cable, Ethernet, wireless (e.g., WiFi, 3G, 4G, etc.), ATM, fiber optics, etc.) It should be noted that the network configurations and interconnections shown and described herein are for illustrative purposes only. FIG. 1 is intended as an example and should not be construed to imply architectural limitations in the present disclosure.

In the example embodiment shown in FIG. 1, command and control server 170 and botnet operator 175 are operably coupled to the Internet 150. In one example, command and control server 170 may be a web server controlled or used by botnet operator 175 to issue commands to distributed bots. In another example, command and control server 170 could be maliciously installed and hidden on a large corporate, educational, or government site. Botnet operator 175 may remotely access command and control server 170 through, for example, the Internet 150 to issue instructions for controlling distributed bots on infected host computers such as hosts 120a, 120b, or 120c. Numerous botnet operators and command and control servers controlling millions of bots may be operably connected to the Internet 150. In one example, once a bot has infected one of hosts 120a, 120b, or 120c, botnet operator 175 may begin issuing commands through command and control server 170 to propagate the bot throughout local network 110 and/or other networks. In addition, botnet operator 175 may also issue instructions for the bot to undertake malicious activities from the infected host 120a, 120b, or 120c such as spam email, theft of confidential information, distributed denial of service attacks, etc.

FIG. 1 also shows a global server 160 connected to Internet 150. While numerous servers may be connected to Internet 150, global server 160 represents a service providing one or more databases containing information related to software program files evaluated for risk. For example, software program files evaluated and determined to be untrustworthy (e.g., containing malicious code such as viruses, worms, and the like, etc.) may be included in a so-called "blacklist". Software program files evaluated and determined to be trustworthy (e.g., uncontaminated, free of malicious code, etc.) may be included in a so-called "whitelist". Although whitelists and blacklists may be implemented separately, it is also possible for them to be combined in a database with each software program file being identified as either a whitelist file or a blacklist file.

Whitelists and blacklists may be implemented using checksums where a unique checksum for each program file is stored, which can be readily compared to a computed checksum of a program file sought to be evaluated. A checksum can be a mathematical value or hash sum (e.g., a fixed string of numerical digits) derived by applying an algorithm to a software program file. If the algorithm is applied to a second software program file that is identical to the first software program file, then the checksums should match. However, if the second software program file is different (e.g., it has been altered in some way, it is a different version of the first software program file, it is a wholly different type of software, etc.) then the checksums are very unlikely to match.

Databases such as global whitelist 165 in FIG. 1 may be provided by independent third parties and may be regularly updated to provide a comprehensive listing of trustworthy software program files available to consumers. Similarly, blacklists (not shown) may be provided by independent third parties and may be regularly updated to provide a comprehensive listing of untrusted, malicious software program files. Global whitelists and blacklists may be external to local network 110 and may be accessible through other networks such as Internet 150, or through any other suitable connection that permits electronic communication between local network 110 and global whitelist 165. Examples of such global whitelists and blacklists include Artemis databases provided by McAfee, Inc. of Santa Clara, Calif., and SignaCert® databases provided by SignaCert, Inc. of Portland, Oreg.

FIG. 1 also includes an internal whitelist 133 shown in local network 110. Internal whitelist 133 may also contain information related to software program files evaluated for risk and may identify such software program files using checksums. Software program files identified in internal whitelist 133 may be inclusive of software program files from one or more global whitelists and/or may be customized to provide selected software program files. In particular, software program files developed internally within the organization, but not necessarily available to the general public, may be identified in internal whitelist 133. Additionally, an internal blacklist could also be provided to identify particular software program files evaluated and determined to be untrustworthy.

In the example embodiment shown in FIG. 1, executable software 122a, 122b, and 122c of hosts 120a, 120b, and 120c may each have a plurality of software program files, which, as previously noted herein, may include any executable files, library modules, object files, other executable modules, script files, interpreter files, and/or the like. If one of hosts 120a, 120b, and 120c has been infected by a bot, then the bot could be stored as a program file in the respective host's executable software 122a, 122b, or 122c. Local protection components 124a, 124b, and 124c may intercept network access attempts, both inbound and outbound, on respective hosts 120a, 120b, and 120c. If any program file associated with a network access attempt has an untrusted status, then network access may be blocked or selectively allowed based on other criteria (e.g., policies, predefined conditions, etc.). If the program file has a trusted status, however, then network access may be allowed.

In some embodiments, central protection components 135 of central server 130 evaluate each program file of executable software 122a, 122b, and 122c and categorize each program file as trusted or untrusted. The program files may be compared to internal whitelist 133, global whitelist 165, internal or external blacklists, or any combination thereof. If an evaluated program file is categorized as untrusted, an entry identifying the untrusted program file may be added to central untrusted software inventory 132. Central server 130 may also maintain logged events database 131 containing information related to network access attempts on any host 120a, 120b, and 120c within local network 110. Logged events database 131, central untrusted software inventory 132, and internal whitelist 133, may be provided in any network and device accessible to central server 130.

Figure 2:
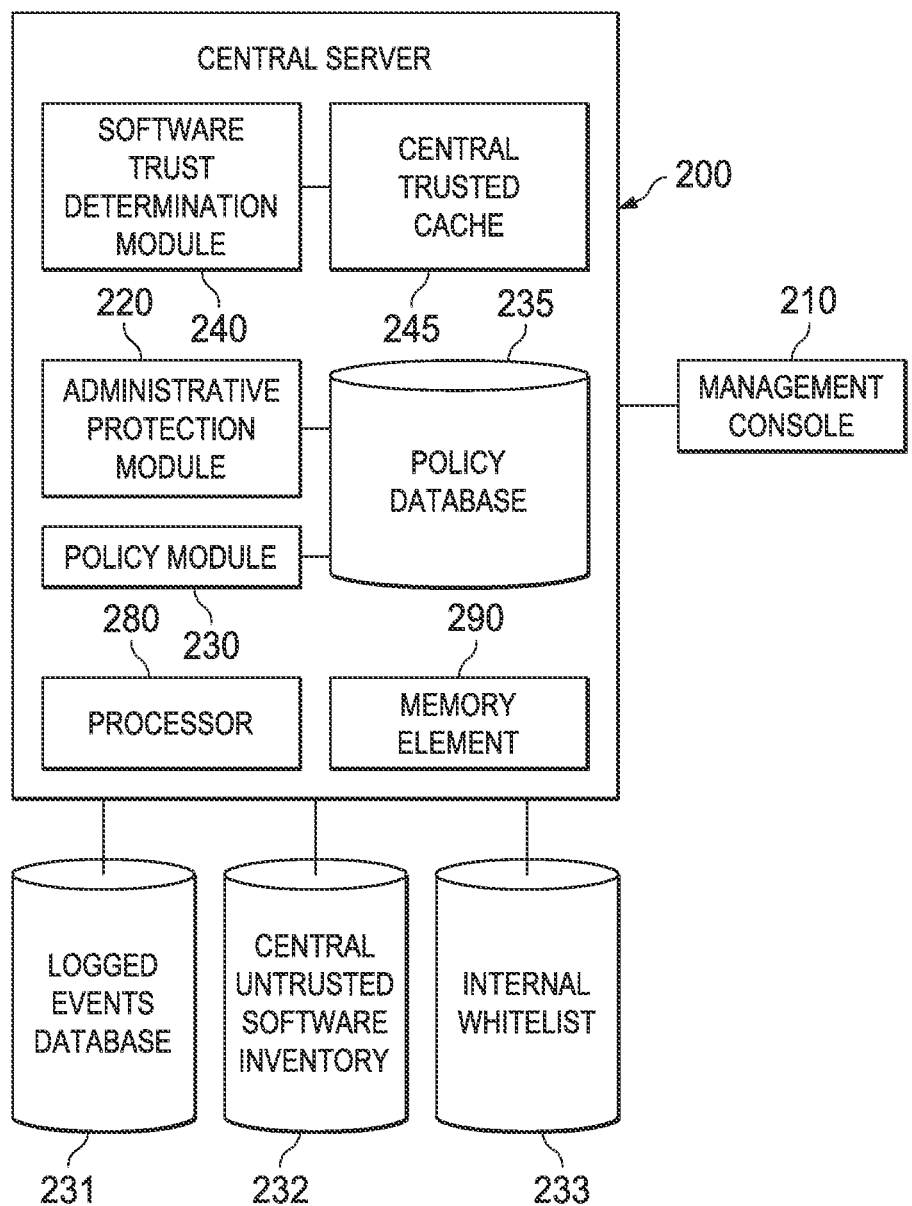
FIG. 2 is a block diagram of one embodiment of a server in which components of the system may be implemented in accordance with embodiments of the present disclosure.

Turning to FIG. 2, FIG. 2 shows a schematic diagram of a central server 200 and associated memory components 231, 232, and 233, which is a more detailed example of central server 130 and associated memory components 131, 132, and 133 shown in FIG. 1. In one example embodiment of the system, central protection components of central server 200 may include an administrative protection module 220, a policy module 230, a policy database 235, and a software trust determination module 240. In one example embodiment, a central trusted cache 245 may also be included for receiving trusted program file cache entries from software trust determination module 240. In other embodiments, however, central server 200 may include or have access to a memory component containing a central untrusted software inventory 232 for storing untrusted program file entries. Central server 200 may also include or have access to memory components such as a logged events database 231 and an internal whitelist 233, in addition to appropriate hardware elements such as a processor 280 and a memory element 290. A management console 210 may also be suitably connected to central server 200 for authorized persons to deploy, configure, and maintain the system through, for example, administrative protection module 220.

In embodiments using central trusted cache 245, the cache may be implemented in hardware as a block of memory for temporary storage of entries (e.g., checksums) identifying program files that have been previously determined to have a trusted status, such as those program files found during searches of global and/or internal whitelists. Central trusted cache 245 can provide quick and transparent access to data indicating program files previously evaluated for a trust status. Thus, if a requested program file is found in central trusted cache 245 then a search of global and/or internal whitelists, or any other trust evaluation, may not need to be performed. In addition, embodiments using central trusted cache 245 may not need to maintain central untrusted software inventory 232.

Figure 3:
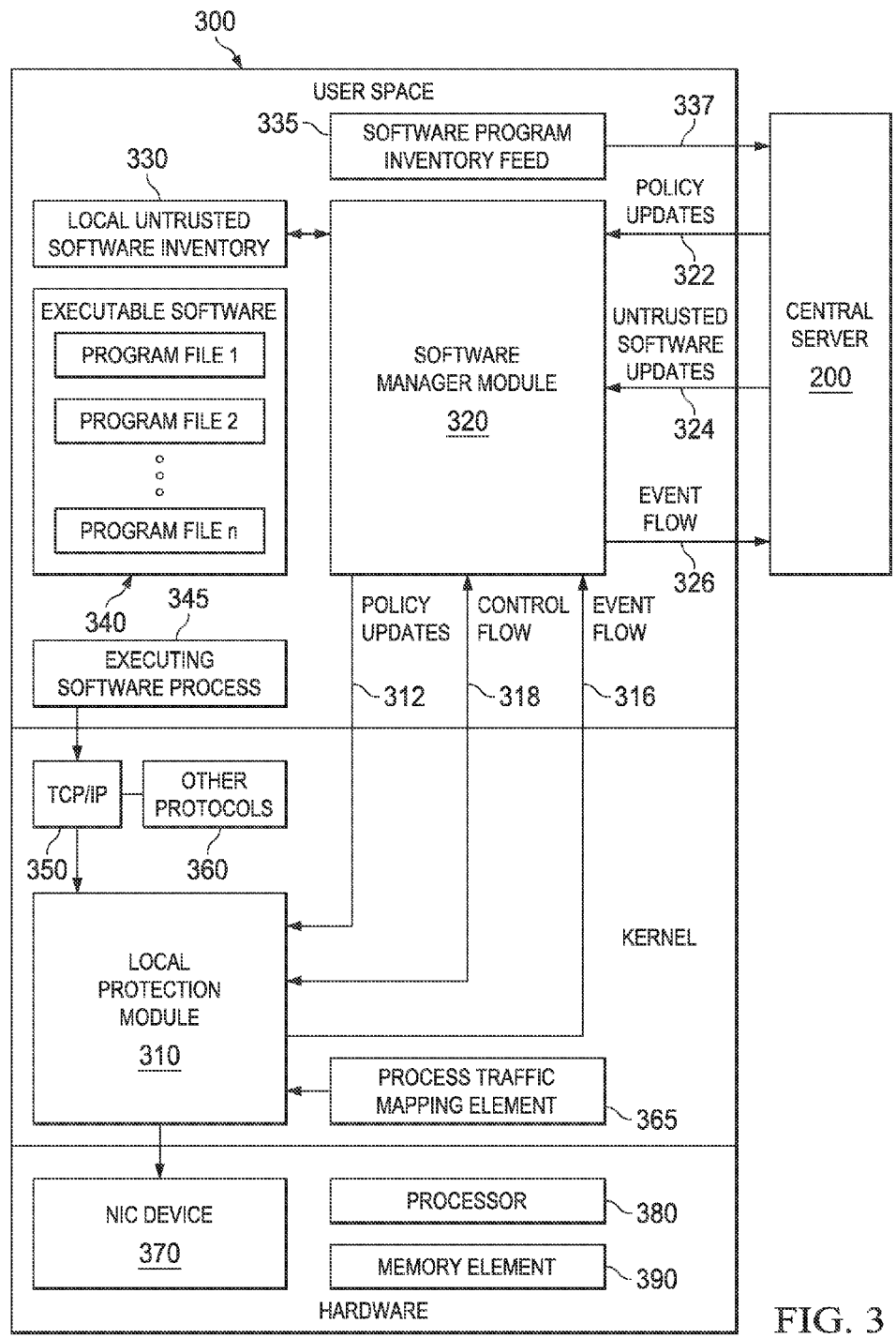
FIG. 3 is a schematic diagram of an example computing device in which components of the system may be implemented in accordance with embodiments of the present disclosure.

Turning to FIG. 3, FIG. 3 shows a schematic diagram of one embodiment of a computing device or host 300 and a block diagram of central server 200, in which the system for local protection against malicious software may be implemented. Host 300 is a more detailed example of hosts 120 of FIG. 1. Host 300 includes a set of executable software 340 including, for example, program files 1 through n. Local network protection components in host 300 may include a local protection module 310, a software manager module 320, a local untrusted software inventory 330, and a software program inventory feed 335. Software manager module 320, local untrusted software inventory 330, and software program inventory feed 335 may reside in a user space of host 300. Also shown in user space of host 300 is an example executing software process 345, which corresponds to one or more of the program files of executable software 340. For ease of reference, executable software 340 is shown in user space on host 300, although it may be stored in a memory element, such as a disk drive on host 300.

Host 300 may also include hardware components such as a network interface card (NIC) device 370, a processor 380, and a memory element 390. Local protection module 310 and transmission protocols, such as Transmission Control Protocol/Internet Protocol (TCP/IP) 350 and other protocols 360, may reside in a kernel space of host 300 and may be implemented as part of a network driver interface specification (NDIS) driver stack, which interfaces with NIC device 370. The operating system kernel provides a process traffic mapping element 365 for mapping software processes to their corresponding program files of executable software 340.

Data flows are shown between software manager module 320 and central server 200 including policy updates flow 322, untrusted software updates flow 324, and event flow 326. Data and control flows are also shown between software manager module 320 and local protection module 310 including policy updates flow 312, control flow 318, and event flow 316. Finally, software program inventory feed 335 is shown with a data flow 337 to central server 200.

Not shown in FIGS. 2 and 3 is additional hardware that may be suitably coupled to processors 280 and 380 in the form of memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements, etc. In addition, suitable modems and/or additional network adapters may also be included for allowing network access. Central server 200 and host 300 may include any additional hardware and software necessary to properly perform their intended functions. Furthermore, any suitable operating systems will also be configured in central server 200 and host 300 to appropriately manage the operation of hardware components therein. It will be appreciated that the hardware configurations may vary and the depicted examples are not meant to imply architectural limitations.

Trust determination and logging activities for executable software 340 may, in example embodiments, be provided at least in part by administrative protection module 220 and software trust determination module 240 of central server 200, and by software program inventory feed 335, software manager module 320, and local protection module 310 of host 300. Information related to the trust determination and logging activities can be suitably rendered, or sent to a specific location (e.g., local untrusted software inventory 330, logged events database 231, etc.), or simply stored or archived (e.g., central untrusted software inventory 232, etc.), and/or properly displayed in any appropriate format (e.g., through management console 210, etc.). Security technology related to one or more such trust determination and logging activities can include elements such as ePolicy Orchestrator software, Application Control software, and/or Change Control software (all manufactured by McAfee, Inc. of Santa Clara, Calif.), or any other similar software. Thus, any such components may be included within the broad scope of the terms 'administrative protection module', 'software trust determination module', 'software program inventory feed', 'software manager module', and 'local protection module' as used herein in this Specification. Logged events database 231, central untrusted software inventory 232, internal whitelist 233, and local untrusted software inventory 330 may include information related to the trust determination and logging of electronic data (e.g., trust determinations for program files, network access attempts of software processes, etc.) and these elements can readily cooperate, coordinate, or otherwise interact with the modules and components of central server 200 and host 300.

Intercepting and blocking activities for network access attempts may, in example embodiments, be provided at least in part in local protection module 310 and software manager module 320 of host 300, and administrative protection module 220 and policy module 230 of central server 200. Information related to the intercepting and blocking activities may be pushed to a specific location (e.g., central server 200, logged events database 231, local protection module 310, etc.), or simply stored or archived locally, and/or properly displayed in any appropriate format (e.g., through management console 210, etc.). Security technology related to one or more such intercepting and/or blocking activities can include elements such as McAfee® ePolicy Orchestrator software or any other similar software. Thus, any such components may be included within the broad scope of the terms 'local protection module', 'software manager module', 'administrative protection module' and 'policy module' as used herein in this Specification. Local untrusted software inventory 330, central untrusted software inventory 232, and policy database 235 may include information related to the intercepting and blocking of network access attempts (e.g., trust determinations for program files, policy configurations, etc.) and these elements can be readily accessed and otherwise interact with the modules and components of central server 200 and host 300.

FIGS. 4-7 include flowcharts of example steps associated with embodiments of the system for local protection against malicious software. For ease of reference, FIGS. 4-7 will be described herein with references to certain components in network environment 100 of FIG. 1 and to server 200, host 300, and their associated components, elements, and modules, although various other devices, components, elements, modules and the like may be used to implement the system and method shown and described herein.

Figure 4:
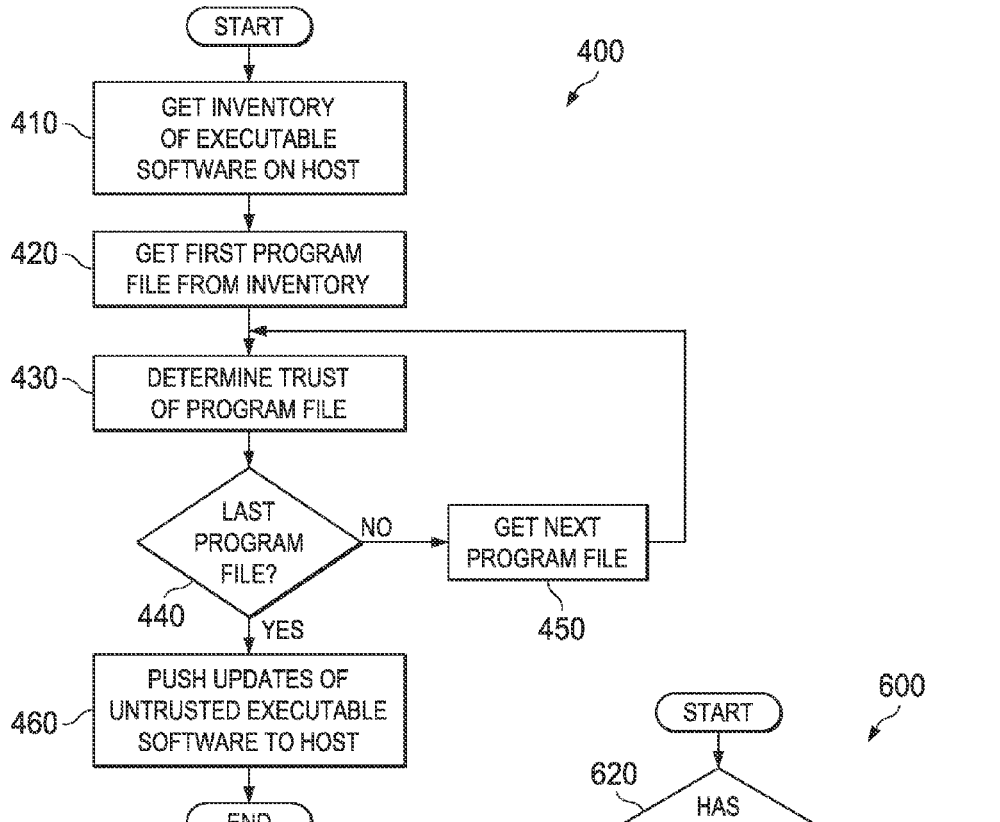
FIG. 4 is a simplified flowchart illustrating a series of example steps associated with the system in accordance with embodiments of the present disclosure.
Figure 5:
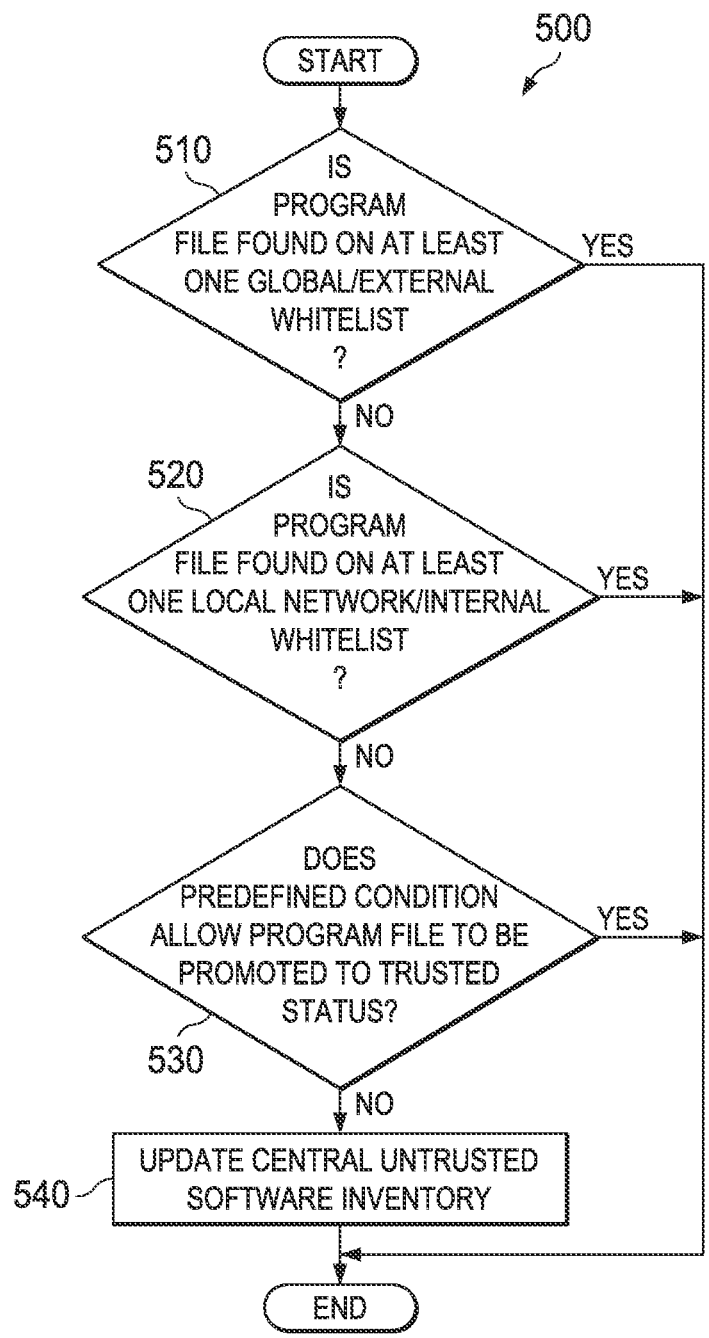
FIG. 5 is a simplified flowchart illustrating a series of example steps of a trust determination flow associated with the system in accordance with embodiments of the present disclosure.

FIGS. 4 and 5 depict enumeration flow 400 and trust determination flow 500, respectively, for creating and maintaining central untrusted software inventory 232 and/or local untrusted software inventory 330. Flow 400 may occur, at least in part, in software trust determination module 240 of central server 200. Beginning in step 410 an inventory of executable software on host 300 is obtained. In example embodiments, this software inventory may be received from software inventory feed 335 of host 300, which may enumerate all program files of executable software 340 on host 300 and push the enumerated program files (i.e., software inventory) to central server 200 via data flow 337. In other embodiments, only new and changed program files of executable software 340 are enumerated and pushed to central server 200. Such enumeration can be achieved by existing security technology such as, for example, Policy Auditor software or Application Control software, both manufactured by McAfee, Inc. of Santa Clara, Calif.

After program files have been enumerated in step 410, each of the program files identified in the software inventory is evaluated to determine a trust status and to categorize accordingly as trusted (i.e., network access may be allowed) or untrusted (i.e., network access may be blocked or selectively allowed). After step 410, flow may pass to step 420 where the first program file is retrieved from the software inventory. Flow then passes to step 430 where the program file is evaluated and then categorized as trusted or untrusted, which will be further shown and described herein with reference to FIGS. 5 and 6. After the program file is categorized as trusted or untrusted in step 430, flow passes to step 440 where a determination is made as to whether the currently evaluated program file is the last program file in the software inventory received by central server 200 from host 300. If the current program file is not the last program file in the software inventory, then the next program file may be retrieved from the software inventory in step 450 and flow may loop back to step 430 to begin the evaluation and trust categorization of the next program. If in step 440, however, the current program file is the last program file in the software inventory, then flow passes to step 460.

In step 460 any newly categorized untrusted program files may be pushed to host 300 to update local untrusted software inventory 330. The push may occur from software trust determination module 240 of central server 200 to software manager module 320 of host 300 via untrusted software updates flow 324. In an example embodiment, software trust determination module 240 of central server 200 could receive a constant feed, or a nearly constant feed, from software program inventory feed 335 of a complete software inventory on host 300 or a software inventory of new or changed program files on host 300, such that central untrusted software inventory 232 and/or local untrusted software inventory 330 are substantially current in real-time. In other embodiments, software trust determination module 240 could receive the enumerated software inventory at regularly scheduled intervals (e.g., daily, hourly, half-hourly, etc.).

Turning to FIG. 5, FIG. 5 illustrates a more detailed flow of a trust determination flow 500 corresponding to step 430 of FIG. 4, which is performed for each program file in the software inventory pushed to central server 200. Flow may begin at step 510 where the current program file is evaluated to determine if it is identified on at least one global whitelist, such as global whitelist 165 shown in FIG. 1, and/or any other whitelist outside of local network 110. As previously described herein, checksums may be used in whitelists to identify program files. If the program file is found on any of the global or other external whitelists in step 510, then a trust status of the program file is defined as trusted and, consequently, flow ends and the program file is categorized as trusted by not updating central untrusted software inventory 232. If the program file is not found on a global or other external whitelist in step 510, however, then flow moves to step 520 where one or more internal whitelists, such as internal whitelist 233, may be searched. Organizations may employ multiple whitelists (e.g., an organization-wide whitelist, an enterprise level whitelist, etc.). If the program file is found on any internal whitelist, the trust status of the program file is defined as trusted and, consequently, flow ends and central untrusted software inventory 232 is not updated.

If the program file is not found on any internal or external whitelist in steps 510 or 520, however, then the program file has an untrusted status. Flow may then move to step 530 where the program file may be evaluated to determine whether the program file satisfies any predefined condition that allows the program file to be promoted from the untrusted status to a trusted status. Such a predefined condition may include heuristic considerations such as, for example, software owned by an administrator, file access controls, file attributes (e.g., creation time, modification time, etc.), and the like. In one example, an untrusted program file owned by an administrator could be promoted to a trusted status and, therefore, flow could end so that the program file is categorized as trusted by not updating central untrusted software inventory 232. If the program file does not satisfy any predefined condition in step 530, however, then the untrusted status persists and the program file may be categorized as untrusted by updating central untrusted software inventory 232 to identify the program file in the last step 540.

Trust determination flow 500 may also include additional logic (not shown) to evaluate blacklists in addition to whitelists. Blacklists identify software program files known to be malicious. Blacklists may be provided by numerous sources including Artemis and Anti-Virus databases provided by McAfee, Inc., and locally maintained blacklists within a local network. In this embodiment, if the program file is found on any internal or external blacklist, then the program file is categorized as untrusted by updating central untrusted software inventory 232 to identify the program file. The untrusted program file information may also be pushed to host 300 to update local untrusted software inventory 330.

Figure 6:
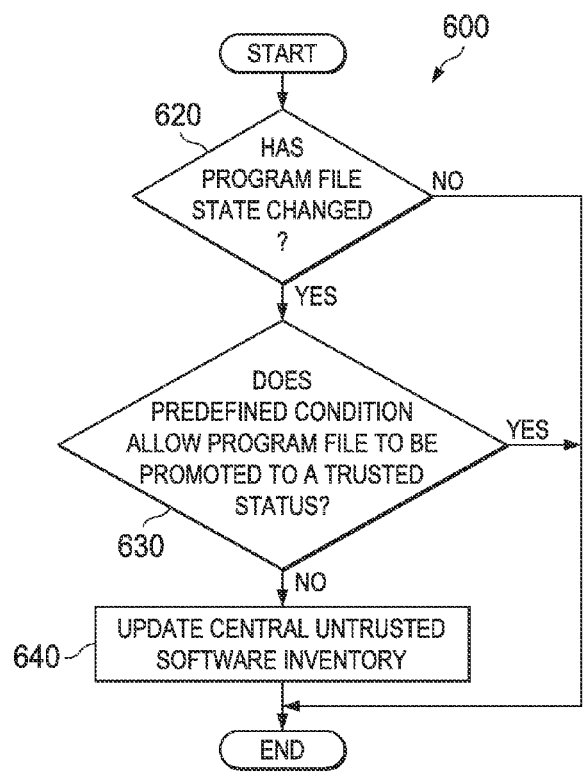
FIG. 6 is a simplified flowchart illustrating a series of example steps of another embodiment of a trust determination flow associated with the system in accordance with embodiments of the present disclosure.

Turning to FIG. 6, FIG. 6 illustrates an alternative embodiment of a trust determination flow 600, corresponding to step 430 of FIG. 4, which may be performed for each program file in the software inventory. Flow may begin at step 620 where the current program file is evaluated to determine whether it has changed. If a current state of the program file has not changed from a previous state, then a trust status of the program file is defined as trusted and flow ends such that central untrusted software inventory 232 is not updated to identify the program file. If the current state of the program file has changed from the previous state, however, then the program file has an untrusted status. Existing change tracking products (e.g., McAfee® Change Control software, McAfee® Application Control software, McAfee® ePolicy Orchestrator software, McAfee® Policy Auditor software, Tripwire® software manufactured by Tripwire, Inc. of Portland, Oreg., etc.) may be used to examine change data of the program files to determine whether a change has occurred. In one example, change records may be aggregated centrally at central server 200, and McAfee® ePO software may make the determination whether the program file has changed.

In FIG. 6, if the program file is determined to have an untrusted status in step 620, flow may then move to step 630 where the program file is evaluated to determine whether any predefined condition exists to allow the program file to be promoted from its untrusted status to a trusted status, as previously described herein with reference to step 530 in FIG. 5. If one or more predefined conditions permit the program file to be promoted to a trusted status, then flow may end and central untrusted software inventory 232 is not updated. If no predefined condition applies to the program file, however, then the untrusted status persists and the program file may be categorized as untrusted by updating central untrusted software inventory 232 to identify the program file in step 640.

In another embodiment, trust determination flows of FIG. 5 or 6 may include additional logic (not shown) to account for program files defined as trusted, which had previously been categorized as untrusted. If the program file is defined as trusted from trust determination flows 500 or 600 of FIGS. 5 and 6, respectively, additional logic may be provided to determine whether the trusted status of the program file has changed from a previously determined untrusted status. In such a case, central untrusted software inventory 232 may be updated to remove or suitably mark the program file entry if its status has been changed from untrusted to trusted. In addition, any such updates could also be pushed to host 300 to update local untrusted software inventory 330 accordingly. This embodiment allows program files that have previously been categorized as untrusted (e.g., a new internal program file not updated in internal whitelists and not known to global/external whitelists, etc.) to be re-categorized to trusted once one of the internal or external whitelists has been updated to identify the new program file.

Alternative implementations to enumerate program files, determine a trust status, and categorize those program files will be readily apparent. Several embodiments previously shown and described herein refer to enumerating an inventory of executable software on each host in a network, such as host 300, pushing the software inventory to central server 200, determining the trust status associated with each program file in the inventory, updating central untrusted software inventory 232 accordingly, and then pushing untrusted software inventory updates to the appropriate host to be locally maintained in local untrusted software inventory 330. In alternative embodiments, however, the trust determination and categorization of software program files could be locally performed by each host and resulting information could be pushed to another location (e.g., central untrusted software inventory 232, etc.) and/or maintained locally (e.g., local untrusted software inventory 330, etc.).

Locally determining a trust status of software program files and then appropriately categorizing the program files could be performed by whitelist evaluations, blacklist evaluations, state change evaluations, or any other suitable trust evaluation technique. In such embodiments an inventory of executable software may be enumerated by, for example, McAfee® software (e.g., Policy Auditor, Application Control, or Change Control). When performing whitelist evaluations as shown in FIG. 5, the host could access internal whitelists on a local network and/or external whitelists accessible through another network, such as the Internet. Program file state change evaluations could also be performed locally by evaluating a current and previous state of the program file for changes, as shown in FIG. 6. For example, McAfee® Change Control software allows a sequence of change records to be locally maintained on hosts, which could be evaluated to determine if any of the program files on a particular host had changed. In addition, the broad scope of this disclosure permits any number of other techniques to be used to determine whether software program files should be categorized as trusted including, for example, performing both whitelist evaluations and state change evaluations on software program files and/or performing blacklist evaluations on software program files.

One or more untrusted software inventories may be suitably configured in various forms in accordance with this disclosure. For example, an untrusted software inventory may reside only in individual hosts (e.g., untrusted software inventory 330), only in another location (e.g., central untrusted software inventory 232), or in some combination thereof. In one embodiment, local untrusted software inventory 330 may contain entries identifying untrusted program files found on host 300, but central untrusted software inventory 232 may contain entries for untrusted program files found on multiple hosts within the network. One exemplary embodiment of central untrusted software inventory 232 incorporates a database table format with one column corresponding to a host name and another column corresponding to a program path of the untrusted program file. Local untrusted software inventory 330 may have a similar format, or may be simplified, for example, to contain only the program file path entries.

Embodiments for enumeration and trust determination and categorization shown and described with reference to FIGS. 4-6 may be implemented by using either a constant feed of the software inventory to central server 200 or by using batch processing at predefined intervals of time. In a batch processing embodiment, windows of time in between the batch processes may enable a bot, which has not yet been added to untrusted software inventory 330, to propagate and/or perform malicious activities by accessing networks. For some businesses, however, this approach may be desirable because the predefined time interval may be insignificant or because alternative approaches may hinder legitimate and necessary business activities. Nevertheless, another embodiment may be implemented to close these windows of time, while still using batch processing to update untrusted software inventory 330.

In this alternative embodiment, a trusted software inventory, rather than an untrusted software inventory, could be created and maintained. Program files associated with a network access attempt could be evaluated to determine if each one is identified on the trusted software inventory. If the program files are all identified on the trusted software inventory, then the network access may be allowed. However, if any of the program files are not identified in the trusted software inventory, then network access may be blocked or selectively allowed, as further described herein. The trusted software inventory may be maintained centrally and/or locally and, in one embodiment, local trusted software inventories may be configured to include only the trusted program files on their corresponding hosts, all trusted program files from hosts within the network, and/or any other trusted program files as determined by a network administrator or other authorized user.

Figure 7:
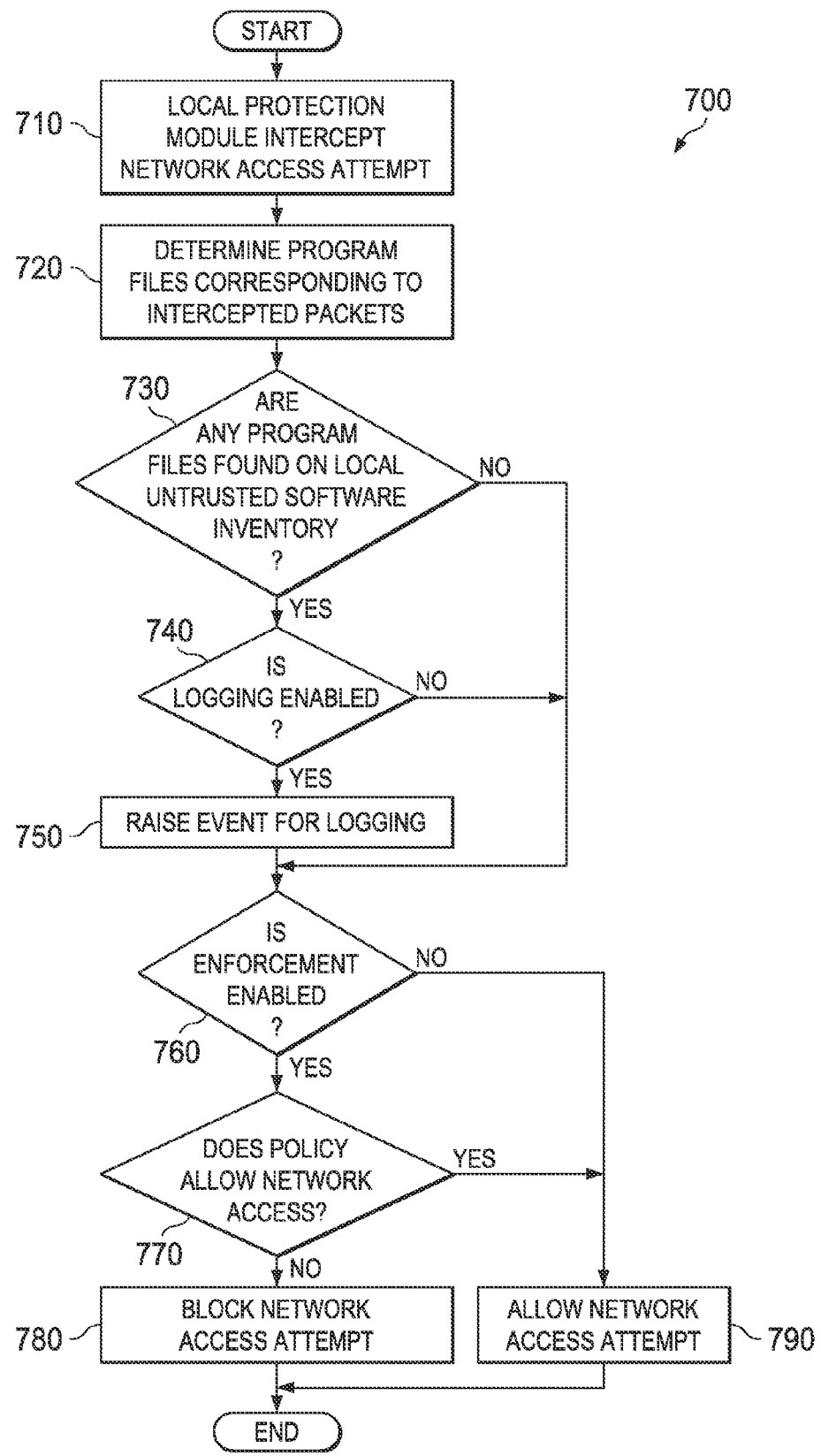
FIG. 7 is a simplified flowchart illustrating a series of example steps associated with the embodiment of the computing device of FIG. 3.

Turning to FIG. 7, a simplified flowchart illustrates a protection flow 700 for intercepting, blocking, and logging activities for a network access attempt (i.e., inbound or outbound) associated with a software process on a host such as executing software process 345 on host 300. In one example, protection flow 700 may be implemented, at least in part, as local protection module 310 of host 300. For ease of reference, protection flow 700 will first be described for an outbound network access attempt from software process 345 on host 300 to a network connected to host 300.

Flow begins at step 710, where local protection module 310 intercepts an outbound network access attempt by software process 345. In one embodiment, processes from executable software 340 use the NDIS driver stack to access a network through NIC device 370 of host 300. Thus, software process 345 may attempt to access a network by sending electronic data through the NDIS driver stack. If the connection is using Internet Protocol Suite, then TCP/IP 350 breaks up the electronic data into packets and provides a requested destination address. Alternatively, the connection may use other protocols 360 (e.g., Internetwork Packet Exchange (IPX), NetBIOS Extended User Interface (Net-BEUI), etc.) to prepare the electronic data for transmission. Once the outgoing packets have been prepared, local protection module 310 then intercepts the packets, which may be attempting any type of network access (e.g., an attempt to look up domain name service (DNS) host names, an attempt to connect to a remote host, an attempt to write to a socket already connected to a network, etc.).

After the outgoing packets have been intercepted, flow passes to step 720 where the operating system may be queried regarding which program files (e.g., executable files, library modules, object files, other executable modules, script files, interpreter files, etc.) correspond to the intercepted packets associated with executing software process 345. In this example, the intercepted packets are mapped to executing software process 345, which may be mapped to an executable file and one or more library modules loaded into process 345. The operating system kernel keeps process traffic mapping element 365 and provides such mapping information to local protection module 310 in step 720. Flow then passes to step 730, in which a query is made as to whether the one or more program files corresponding to the intercepted packets from process 345 are trusted. In one example, local protection module 310 may query software manager module 320 via control flow 318 for information regarding the program files. Software manager module 320 may then access local untrusted software inventory 330 to determine whether the program files are categorized as untrusted or trusted, and then return such information to local protection module 310 via control flow 318.

If any of the program files are categorized as untrusted (i.e., one or more of the program files are found on local untrusted software inventory 330) in step 730, then flow passes to step 740 to determine whether logging is enabled. If logging is enabled in step 740, then flow passes to step 750 to raise the event (i.e., the network access attempt) for logging. For example, event data (e.g., information related to the network access attempt and its associated program files) may be sent to software manager module 320 via event flow 316, and then software manager module 320 may either log the event data locally, or send the event data to another location for logging such as, for example, central server 200 via event flow 326. In example embodiments, administrative protection module 220 of central server 200 may be adapted to store the event data in a memory element such as logged events database 231. Examples of possible event data stored in logged events database 231 include identification and/or program paths of the program files associated with the intercepted packets, identification of the host on which the event occurred, a date and time stamp of the network access attempt, a type of network access attempt, a destination and/or source address of the network access attempt, port numbers associated with the network access attempt, and the like. Administrative protection module 220 may also provide access to logged events database 231 through management console 210 or other reporting mechanisms.

After the event has been raised for logging in step 750, or if logging was not enabled in step 740, then flow passes to step 760 to determine whether enforcement is enabled. If enforcement is not enabled, the flow passes to step 790 where software process 345 is allowed to access the network and the intercepted packets are passed to NIC device 370. However, if enforcement is enabled in step 760 then policy may be evaluated in step 770 to determine whether any configured policy overrides the untrusted status of the program files such that network access or selective network access associated with software process 345 is allowed.

In one embodiment, policy configurations may be crafted by a network administrator and such policies may be pushed to each host, such as host 300. For example, policy module 230 of central server 200 may allow an administrator or other authorized user to craft policy configurations through management console 210, and to store such policies in policy database 235. Administrative protection module 220 may then push any relevant policy configurations to software manager module 320 of host 300 via policy updates flow 322. Software manager module 320 may further push policy configurations to local protection module 310 via policy updates flow 312. Alternatively, policy configurations may be stored, for example, in a disk drive of host 300 and local protection module 310 may query software manager module 320 for any relevant policies for a particular process being evaluated.

Policy configurations may be implemented as desired by particular network owners. In some example embodiments, policy configurations may include one or more broad-based restrictions such as blocking all inbound and outbound network access, blocking all inbound network access and allowing outbound network access, or allowing inbound network access and blocking outbound network access. More specific strategies may also be employed, such as blocking outbound network access to the local network but allowing outbound network access to the Internet, or allowing inbound network access from a specified subnet of source addresses and/or allowing outbound network access to a specified subnet of destination addresses. Finally, even more granular strategies may be used such as blocking specified inbound and/or outbound network connections (e.g., domain name service (DNS), simple mail transfer protocol (SMTP), Internet Relay Chat (IRC), etc.). These example policy configurations are for illustrative purposes to show possibilities of network access restrictions and are intended to include any other policy configuration to restrict inbound and/or outbound network access or any combination thereof.

Specific network level policies may also be crafted for untrusted program files. For example, a policy may be crafted to redirect a network access attempt associated with an untrusted program file to another computing device, such as a secondary server. In one example, a potentially malicious network access attempt associated with an untrusted program file could be forced through additional firewalls, filters, antispam/antivirus gateways, proxies, and the like, when using this redirection. In another example, the secondary server may be configured to respond with one or more predefined commands upon receiving a network connection. Some bots are designed to self-destruct upon receiving particular commands and the secondary server could be configured to respond to a network connection with such commands, thereby causing a bot that has been redirected to the secondary server to be destroyed.

Particular policy configurations may be balanced between competing interests such as the need to prevent the propagation and potentially malicious activities of untrusted software and the need to conduct necessary business activities. For example, in a network having a host subnet and a server subnet, a policy may be configured to allow software processes associated with untrusted program files to access only the server subnet but not the host subnet. This may be desirable because it may prevent the propagation of malicious software to other hosts within the network, while allowing the host uninterrupted access to a secured server subnet. Another policy may block software processes associated with untrusted program files from accessing the Internet except for a known subnet hosting job critical services. Thus, many different blocking options may be employed by crafting policies allowing selective network access.

Turning back to step 770 of FIG. 7, if a policy has been crafted to allow selective network access by one or more untrusted program files corresponding to executing software process 345, and the intercepted packets conform to the particular policy requirements (e.g., the packets have a destination address within an allowed subnet of addresses in accordance with the policy applied to the untrusted program file, etc.) then flow passes to step 790 where software process 345 is allowed network access and the packets are passed to NIC device 370. However, if the policy does not override the untrusted status of the one or more program files (i.e., the policy does not allow network access or no policy is applicable), then flow passes to step 780 and software process 345 is blocked from network access. In one example, blocking occurs by forcing a TCP connect call to fail and returning an error code to software process 345, thereby preventing the intercepted packets from being passed to NIC device 370.

With reference again to step 730, if the program files are categorized as trusted (i.e., none of the programs files are found on local untrusted software inventory 330), then flow passes to step 760 to determine whether enforcement is enabled. If enforcement is not enabled, the flow passes to step 790 where software process 345 is allowed network access and the intercepted packets are passed to NIC device 370. However, if enforcement is enabled in step 760 then policy may be evaluated in step 770 to determine whether a configured policy overrides the trusted status of the one or more program files. For example, if an untrusted program file was previously intercepted and a policy provided for some type of blocking to be applied to all outbound network access attempts, then any trusted program files associated with a subsequent network access attempt may be evaluated and possibly blocked from network access by that policy. Thus, if a policy overrides the trusted status of the one or more program files (i.e., policy does not allow network access), then flow passes to step 780 and software process 345 is blocked from network access. If the trusted status is not overridden by policy (i.e., policy allows network access or no policy is applicable) in step 770, however, then flow passes to step 790 where software process 345 is allowed network access and the intercepted packets are passed to NIC device 370.

Protection flow 700 of FIG. 7 also represents a flow used for intercepting, blocking and logging activities for inbound network access attempts to host 300. At step 710, local protection module 310 intercepts an inbound network access attempt from NIC device 370. The inbound network access attempt may be, for example, a TCP listen or accept call, and may be associated with an executing software process on host 300 such as software process 345. Incoming intercepted packets are evaluated in steps 720 through 770, which have previously been described herein with reference to outgoing intercepted packets of network access attempts. If the flow from steps 720 through 770 proceeds to step 790 then the incoming intercepted packets are permitted to access host 300. However, if the flow proceeds to step 780, then the incoming intercepted packets are blocked from accessing host 300. In one example, blocking occurs by forcing a listen or accept call to fail, and returning an error code to the caller of the listen or accept API. In addition, as previously described herein, numerous policy configurations for inbound network access attempts are possible. In one example, if it is determined in step 770 that a policy has been crafted to allow selected inbound network access attempts associated with one or more untrusted program files, and the incoming packets conform to the particular policy requirements (e.g., the packets have a source address within an allowed subnet of addresses in accordance with the policy applied to the untrusted program files, etc.) then flow passes to step 790 where the incoming intercepted packets are permitted to access host 300. In another example, if a policy was applied to a previous network access attempt (i.e., inbound or outbound) and provided for some type of blocking to be applied to subsequent network access attempts, then a process associated with a subsequent inbound network access attempt may be blocked from access or selectively allowed access to the host in accordance with that policy, even if all of its corresponding program files have a trusted status.

Figure 8:
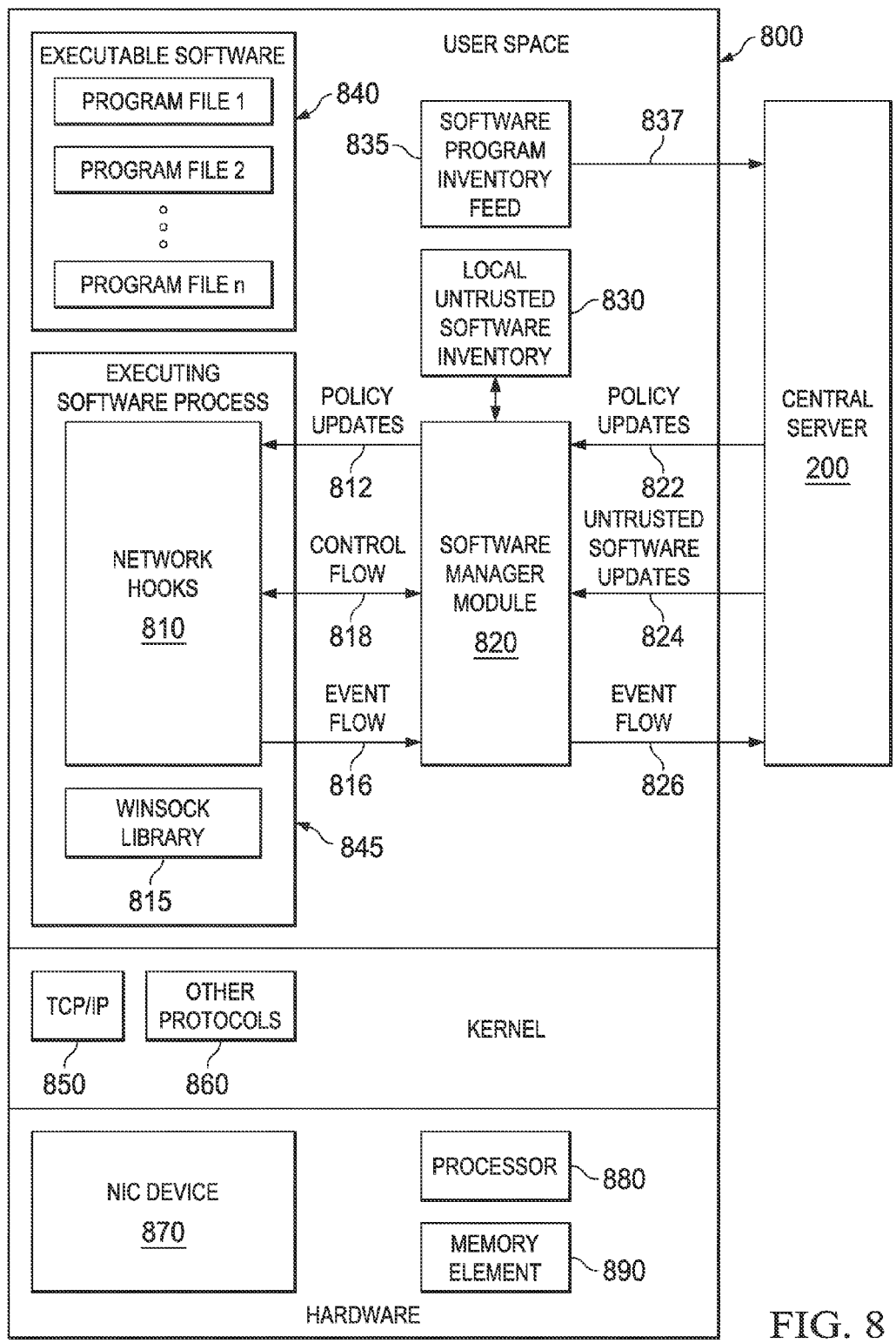
FIG. 8 is a simplified schematic diagram of another example computing device in which components of the system may be implemented in accordance with embodiments of the present disclosure.

Turning to FIG. 8, FIG. 8 shows a schematic diagram of another embodiment of a computing device or host 800 and a block diagram of central server 200, in which another embodiment of a system for local protection against malicious software may be implemented. Host 800 is a more detailed example of one embodiment of hosts 120 of FIG. 1. Host 800 includes a set of executable software 840 such as, for example, program files 1 through n. Local network protection components in host 800 may include network hooks 810, a software manager module 820, a local untrusted software inventory 830, and a software program inventory feed 835. For ease of reference, executable software 840 is shown in user space on host 800, although it may be stored in a memory element, such as a disk drive on host 800.

Software manager module 820, local untrusted software inventory 830, and software program inventory feed 835 may reside in a user space of host 800, along with any currently executing software processes such as software process 845. When a program file is executed and creates executing software process 845, as shown in the embodiment in FIG. 8, Windows Sockets API (Winsock) library 815 may be loaded in software process 845 as a dependency and network hooks 810 may be loaded as a dependency to Winsock library 815, along with any other library modules loaded by executing software process 845. Existing security technology such as Host Intrusion Prevention System (HIPS) software, manufactured by McAfee, Inc., may be used to implement network hooks 810.

Data flows are shown between software manager module 820 and central server 200 including policy updates flow 822, untrusted software updates flow 824, and event flow 826. Data and control flows are also shown between software manager module 820 and network hooks 810, including policy updates flow 812, control flow 818, and event flow 816.

Host 800 may also include hardware components such as a network interface card (NIC) device 870, a processor 880, and a memory element 890. A kernel space of host 800 may include transmission protocols such as Transmission Control Protocol/Internet Protocol (TCP/IP) 850 and other protocols 860. Not shown in FIG. 8 is additional hardware and software as described with reference to host 300 of FIG. 3.

Network hooks 810 and software manager module 820 may be configured to provide, at least in part, intercepting, blocking, and logging activities for network access attempts associated with processes from program files of executable software 840, such as software process 845, on host 800. Information related to the intercepting, blocking, and logging activities may be pushed to a specific location (e.g., central server 200, logged events database 231, etc.), or simply stored or archived locally, and/or properly displayed in any appropriate format (e.g., through management console 210, etc.). Security technology related to one or more such intercepting, blocking, and logging activities can include elements as previously described herein with reference to FIG. 3, and may be inclusive of McAfee® HIPS software. Thus, any such components may be included within the broad scope of the terms 'network hooks' and 'software manager module' as used herein in this Specification. Local untrusted software inventory 830 may include information related to the blocking and logging of electronic data, such as trust categorizations for the program files of executable software 840, and these elements can readily cooperate, coordinate, or otherwise interact with network hooks 810 and software manager module 820.

Figure 9:
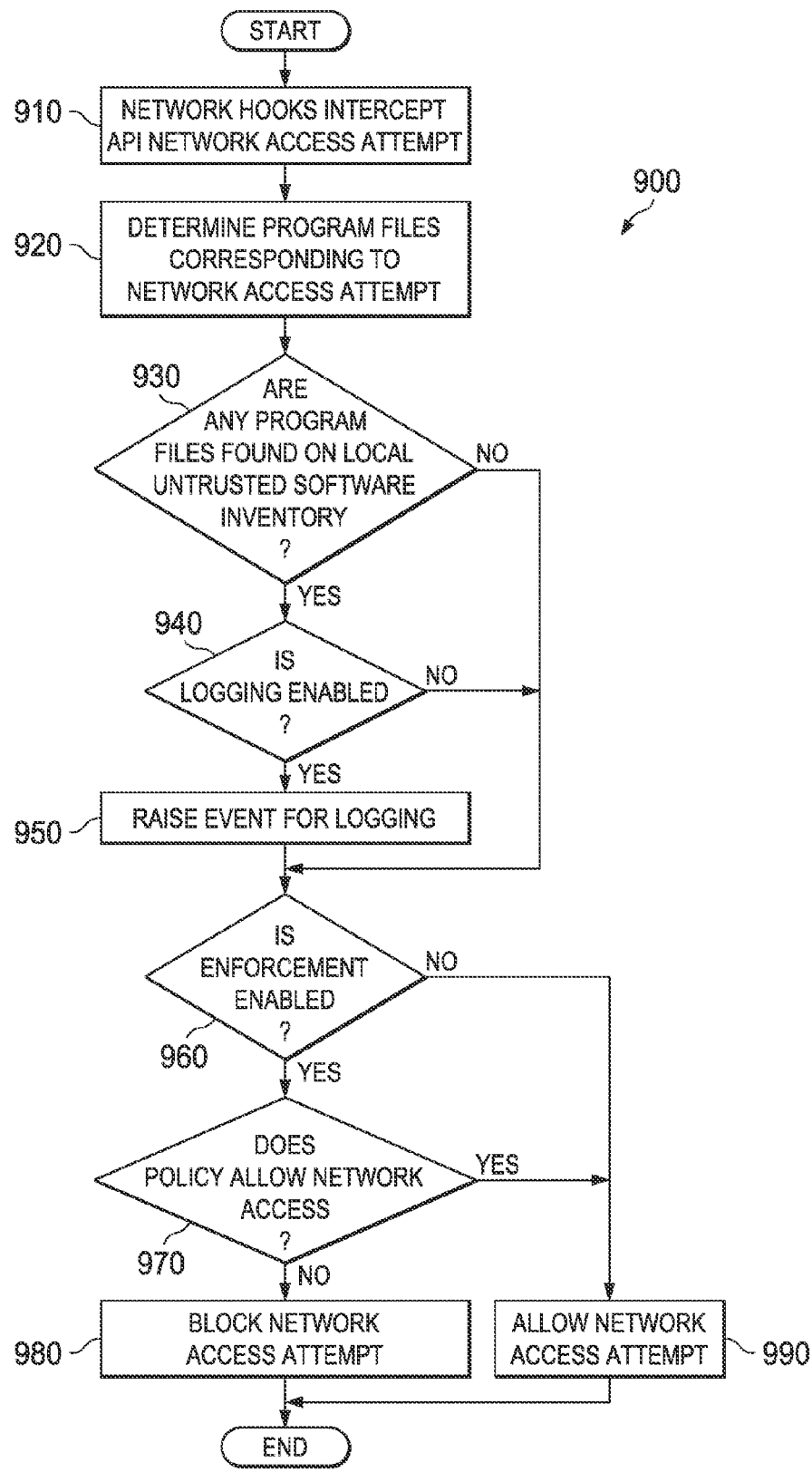
FIG. 9 is a simplified flowchart illustrating a series of example steps associated with the embodiment of the computing device of FIG. 8.

Turning to FIG. 9, a simplified flowchart illustrates a protection flow 900 for intercepting, blocking and logging activities for a network access attempt (i.e., inbound or outbound) associated with a software process on a host such as executing software process 845 on host 800. In one example, protection flow 900 may be performed in part by network hooks 810 and in part by software manager module 820 of host 800. For ease of reference, protection flow 900 will first be described for an outbound network access attempt from software process 845 on host 800 to a network connected to host 800.

Flow begins at step 910, where network hooks 810 intercept an API outbound network access attempt (e.g., connect API, send API, etc.) from software process 845. Because network hooks 810 have been loaded into software process 845 as a dependency on Winsock library 815, network hooks 810 can intercept API network access attempts before they are passed to Winsock library 815, which interfaces to TCP/IP protocol stack 850. The network access attempt may be any type of network access (e.g., an attempt to look up domain name service (DNS) host names, an attempt to connect to a remote host, an attempt to write to a socket already connected to a network, etc.). Once the API has been intercepted, flow passes to step 920 to determine which program files (e.g., executable files, library modules, object files, other executable modules, script files, interpreter files, etc.) are associated with executing software process 845. In this example, the intercepted API is mapped to executing software process 845, which may be mapped to an executable file and one or more library modules loaded into process 845. In example embodiments, software manager module 820 is queried by network hooks 810 via control flow 818 regarding which program files are mapped to executing software process 845, which is mapped to the intercepted API. Software manager module 820 may use an operating system API to obtain such mapping information.

Once the program files are identified, flow passes to steps 930 through 990, which may be similar to steps 730 through 790 of protection flow 700 of FIG. 7. In step 930 a query is made as to whether any of the program files corresponding to software process 845 are found on local untrusted software inventory 830. In one example, software manager module 820 may access local untrusted software inventory 830 to determine whether the program files are categorized as untrusted or trusted. If any of the program files are categorized as untrusted (i.e., one or more of the program files are found on local untrusted software inventory 830) in step 930, then flow passes to step 940 to determine whether logging is enabled. If logging is enabled, then flow passes to step 950 to raise the event (i.e., the network access attempt) for logging, as previously described herein with reference to FIG. 7.

After the event has been raised for logging in step 950, then flow passes to step 960 to determine whether enforcement is enabled. If enforcement is not enabled, then software manager 820 may pass this information to network hooks 810 via control flow 818. The flow then passes to step 990 where software process 845 is allowed to access the network by passing the API to Winsock 815. However, if enforcement is enabled in step 960, policy may be evaluated in step 970 to determine whether any configured policy overrides the untrusted status of the one or more untrusted program files, as previously described herein with reference to FIG. 7. In one embodiment, the policy evaluation may occur in software manager module 820 and the results may be passed to network hooks 810 via control flow 818.

Policy configurations may be crafted by a network administrator or other authorized user through, for example, administrative protection module 220 of central server 200. Administrative protection module 220 may push any relevant policy configurations to software manager module 820 of host 800 via policy updates flow 822. If a policy has been crafted to allow selective network access by the one or more untrusted program files corresponding to software process 845, and the API conforms to the particular policy requirements (e.g., the API network access attempt includes a destination address within an allowed subnet of addresses in accordance with the policy, etc.) then software manager module 820 may return such information to network hooks 810 via control flow 818. Flow then passes to step 990 where the API is passed to Winsock 815 and software process 845 is allowed to access the network. However, if the policy does not allow network access in step 970 or if an applicable policy does not exist, then software manager module 820 may return such information to network hooks 810 via control flow 818, and flow then passes to step 980 where the API is not passed to Winsock 815. Instead, network hooks 810 may return an error condition to software process 845, thereby blocking network access.

With reference again to step 930, if the program files are categorized as trusted (i.e., the program files are not found on local untrusted software inventory 830) then flow passes to step 960 to determine whether enforcement is enabled. If enforcement is not enabled, the flow passes to step 990 where the API is passed to Winsock 815 and software process 845 is allowed to access the network. However, if enforcement is enabled in step 960 then policy may be evaluated in step 970 to determine whether a configured policy overrides the trusted status, as previously described herein with reference to FIG. 7. If a policy overrides the trusted status of the one or more program files, then flow passes to step 980 and the API is not passed to Winsock 815. Instead, network hooks 810 may return an error condition to software process 845, thereby blocking network access. If the trusted status of the one or more program files is not overridden by policy in step 970, however, then flow passes to step 990 where the API is passed to Winsock 815 and software process 845 is allowed to access the network.

Protection flow 900 also represents a flow used for intercepting, blocking and logging activities for inbound network access attempts to host 300. At step 910, network hooks 810 intercept an API inbound network access attempt (e.g., listen API, accept API, etc.), from Winsock library 815. The inbound network access attempt is evaluated in steps 920 through 970, which have been previously described herein with reference to outbound intercepted APIs. If the flow from steps 920 through 970 proceeds to step 990, then the inbound network access attempt is permitted to access host 300. However, if the flow proceeds to step 980, then the inbound network access attempt is blocked from accessing host 300. In one example, blocking occurs by rejecting a listen or accept call and returning an error code to the caller of the listen or accept API. In addition, policy configurations for inbound network access may also be applied in step 970, as previously described herein with reference to FIG. 7.

Figure 10:
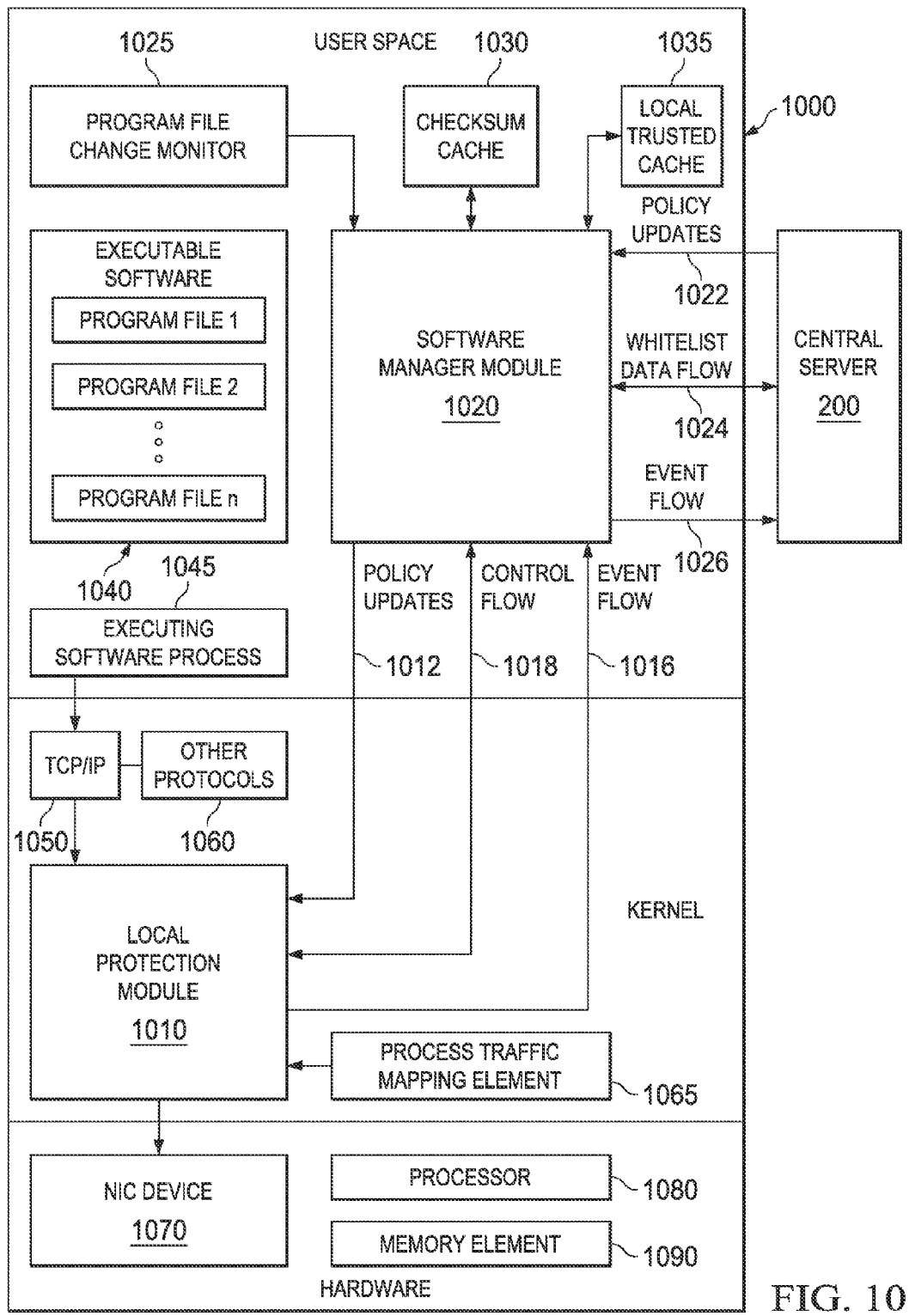
FIG. 10 is a simplified schematic diagram of another example computing device in which components of the system may be implemented in accordance with other embodiments of the present disclosure.

Turning to FIG. 10, FIG. 10 shows a schematic diagram of another embodiment of a computing device or host 1000 and a block diagram of central server 200, in which the system for local protection against malicious software may be implemented. Host 1000 is a more detailed example of hosts 120 of FIG. 1. Host 1000 may include a set of executable software 1040 including, for example, program files 1 through n. Local network protection components in host 1000 may include a local protection module 1010, a software manager module 1020, a program file change monitor 1025, a checksum cache 1030, and a local trusted cache 1035. In one embodiment, checksum cache 1030 and local trusted cache 1035 may be configured with program file paths and checksums for corresponding software program files. Software manager module 1020 and program file change monitor 1025 may reside in a user space of host 1000. Also shown in user space of host 1000 is an example executing software process 1045, which corresponds to one or more of the program files of executable software 1040. For ease of reference, executable software 1040 is shown in user space on host 1000, although it may be stored in a memory element, such as a disk drive on host 1000.

Host 1000 may also include hardware components such as a network interface card (NIC) device 1070, a processor 1080, and a memory element 1090. Local protection module 1010 and transmission protocols, such as Transmission Control Protocol/Internet Protocol (TCP/IP) 1050 and other protocols 1060, may reside in a kernel space of host 1000 and may be implemented as part of a network driver interface specification (NDIS) driver stack, which interfaces with NIC device 1070, in a similar manner to the embodiment shown and described with reference to host 300 in FIG. 3. The operating system kernel provides a process traffic mapping element 1065 mapping software processes to their corresponding program files of executable software 1040.

Data flows are shown between software manager module 1020 and central server 200 including policy updates flow 1022, whitelist query data flow 1024, and event flow 1026. Data and control flows are also shown between software manager module 1020 and local protection module 1010, including policy updates flow 1012, control flow 1018, and event flow 1016. Finally, checksum cache 1030 and local trusted cache 1035 may have bidirectional flows to software manager module 1020, and program file change monitor 1025 feeds software manager module 1020 with data indicating when a change has occurred in a program file. Not shown in FIG. 10 is additional hardware of host 1000 that may be similar to additional hardware previously described herein with reference to host 300 of FIG. 3.

Local trusted cache 1035 and checksum cache 1030 may be configured in hardware of host 1000 as blocks of memory for temporary storage. Local trusted cache 1035 may contain entries (e.g., checksums) identifying program files that have previously been determined to have a trusted status using trust evaluation techniques such as searching global whitelists, searching internal whitelists, searching blacklists, evaluating program file changes, or any combination thereof. Thus, if a program file is found in local trusted cache 1035, then central server 200 may not need to be queried for a trust status of that particular program file. Checksum cache 1030 may contain entries (e.g., checksums and program file paths) identifying previously computed checksums of software program files on host 1000. Because checksum computation can use valuable processing resources, computed checksums may be stored in checksum cache 1030, along with a corresponding program file path to prevent unnecessary duplicative checksum computations. Such data stored in caches 1035 and 1030 can result in quicker retrieval and overall processing during network access attempts and software trust determination processing.

When program files change (e.g., new software version, software upgrade, etc.), their corresponding checksums change and, therefore, checksum cache 1030 may need to be updated. In example embodiments, program file change monitor 1025 can update checksum cache 1030 by performing an out of band inspection of the program files on host 1000 and providing a data feed indicating changed program files to software manager module 1020 to update checksum cache 1030. Existing change tracking products (e.g., McAfee® Change Control software, McAfee® Application Control software, McAfee® ePolicy Orchestrator software, McAfee® Policy Auditor software, Tripwire® software manufactured by Tripwire, Inc. of Portland, Oreg., etc.) may be used to examine the program files on host 1000 to determine whether a change has occurred. In example embodiments, program file change monitor 1025 may provide real-time data to software manager module 1020 indicating a change to a program file on host 1000. After receiving the changed program file data, software manager module 1020 may search checksum cache 1030 for a program file path corresponding to the changed program file and if found, may remove the checksum entry associated with the program file path. While checksum cache 1030 and program file change monitor 1025 provide one embodiment for providing, maintaining, and updating program file checksums for program files on host 1000, any number of alternative approaches could be utilized (e.g., remote checksum module, database implementation, etc.), as long as the appropriate checksum can be provided for the program file located at a given program file path.

In a system for local protection that implements the embodiment of host 1000 and central server 200, untrusted software inventories (e.g., local untrusted software inventories, central untrusted software inventory 232, etc.) may not be necessary components. Alternatively, central trusted cache 245 of central server 200, local trusted cache 1035 of host 1000, and checksum cache 1030 of host 1000 may be utilized for quick retrieval of data previously computed or otherwise determined during software trust determination processing.

Trust determination, blocking, intercepting, and logging activities for executable software 1040 may, in example embodiments, be provided at least in part by administrative protection module 220 and software trust determination module 240 of central server 200, and by software manager module 1020, program file change monitor 1025, and local protection module 1010 of host 1000. Information related to such activities can be suitably rendered, or sent to a specific location (e.g., checksum cache 1030, local trusted cache 1035, central trusted cache 245, logged events database 231, etc.), or simply stored or archived, and/or properly displayed in any appropriate format (e.g., through management console 210, etc.). Security technology related to one or more such trust determination, blocking, intercepting, and logging activities can include elements such as McAfee® ePolicy Orchestrator software, firewalling software such as McAfee® Host Intrusion Prevention System (HIPS) software, change tracking software, and/or any other similar software. Thus, any such components may be included within the broad scope of the terms 'administrative protection module', 'software trust determination module', 'program file change monitor', 'software manager module', and 'local protection module' as used herein in this Specification. Logged events database 231, internal whitelist 233, central trusted cache 245, checksum cache 1030, and local trusted cache 1035 may include information related to the trust determination, blocking, intercepting and logging of electronic data (e.g., trust determinations for program files, network access attempts of software processes, etc.) and these elements can readily cooperate, coordinate, or otherwise interact with the modules and components of central server 200 and host 1000.

Figure 11:
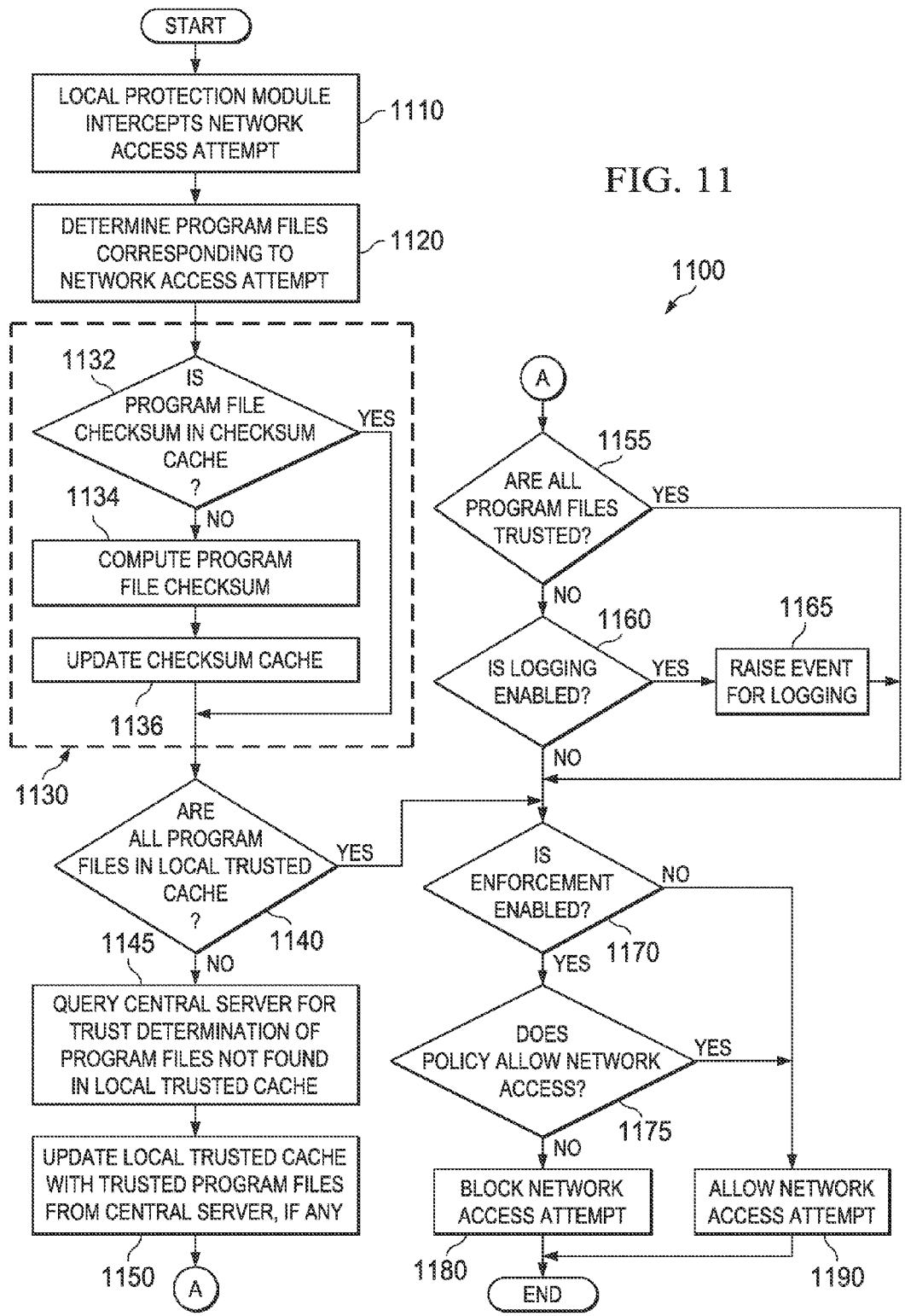
FIG. 11 is a simplified flowchart illustrating a series of example steps associated with the embodiment of the computing device of FIG. 10.

Turning to FIG. 11, a simplified flowchart illustrates a protection flow 1100 for intercepting, blocking, and logging activities for a network access attempt (i.e., inbound or outbound) associated with a software process on a host such as executing software process 1045 on host 1000. In one example, protection flow 1100 may be implemented, at least in part, as local protection module 1010 of host 1000. For ease of reference, protection flow 1100 will first be described for an outbound network access attempt from software process 1045 on host 1000 to a network connected to host 1000.

Flow begins at step 1110, where local protection module 1010 intercepts an outbound network access attempt by software process 1045. In one example, processes from executable software 1040 use the NDIS driver stack to access a network through NIC device 1070 of host 1000. Thus, software process 1045 may attempt to access a network by sending electronic data through the NDIS driver stack, as previously described herein with reference to FIGS. 3 and 7.

Once the outgoing packets have been intercepted, flow passes to step 1120 where the operating system may be queried regarding which program files (e.g., executable files, library modules, object files, other executable modules, script files, interpreter files, etc.) correspond to the intercepted packets from executing software process 1045. In this example, the intercepted packets are mapped to executing software process 1045, which may be mapped to an executable file and one or more library modules loaded into process 1045. The operating system kernel keeps process traffic mapping element 1065 and provides such mapping information to local protection module 1010 in step 1120.

Flow may then pass to steps 1132-1136, designated by 1130, which may be performed for each program file associated with the network access attempt. In step 1132, a query is made as to whether a checksum of a first program file associated with the network access attempt is found in checksum cache 1030. In one embodiment, checksum cache 1030 will be searched for a program file path of the first program file. If the program file path is not found, then a checksum is computed for the first program file in step 1134. In step 1136, checksum cache 1030 is updated with the program file path and the newly computed checksum. Steps 1132-1136 are repeated for each additional program file associated with the network access attempt. In one example scenario, a checksum may not be found in step 1132 if the checksum was previously removed from checksum cache 1030 when software manager module 1020 received a data feed from program file change monitor 1025 indicating the program file had changed. Thus, in this scenario, a new checksum would be computed in step 1134 for the changed program file and then stored in checksum cache 1030 in step 1136. As previously mentioned herein, any alternative approach could be utilized to provide checksums as long as the appropriate checksum can be provided for a program file located at a given program file path.

After steps 1132-1136 are performed for each program file associated with the network access attempt, flow then passes to step 1140. In step 1140, a query is made as to whether all program files associated with the network access attempt are found in local trusted cache 1035, and if so, then each of the program files has previously been determined to have a trusted status and flow passes to step 1170 to determine whether enforcement is enabled. If enforcement is not enabled, then flow passes to step 1190 where software process 1045 is allowed network access and the intercepted packets are passed to NIC device 1070. However, if enforcement is enabled in step 1170 then policy may be evaluated in step 1175 to determine whether policy overrides the trusted status of the one or more program files, as previously described herein with reference to FIG. 7.

Policy configurations may be crafted by a network administrator, as previously described herein, and such policies may be pushed to host 1000 via policy updates flow 1022. Software manager module 1020 may further push policy configurations to local protection module 1010 via policy updates flow 1012. Alternatively, policy configurations may be stored, for example, in a memory element such as in disk drives of host 1000 and local protection module 1010 may query software manager module 1020 for any relevant policies for a particular process and/or program file being evaluated.

If a policy overrides the trusted status of the one or more program files (i.e., policy does not allow network access), as previously described herein, then flow passes to step 1180 where the software process 1045 is blocked from network access and the outgoing packets are not passed to NIC device 1070. However, if in step 1175 the trusted status of the one or more program files is not overridden by policy (i.e., a policy allows network access or no policy is applicable) then flow passes to step 1190 where the outgoing packets are passed to NIC device 1070 and software process 1045 is allowed to access the network.

Figure 12:
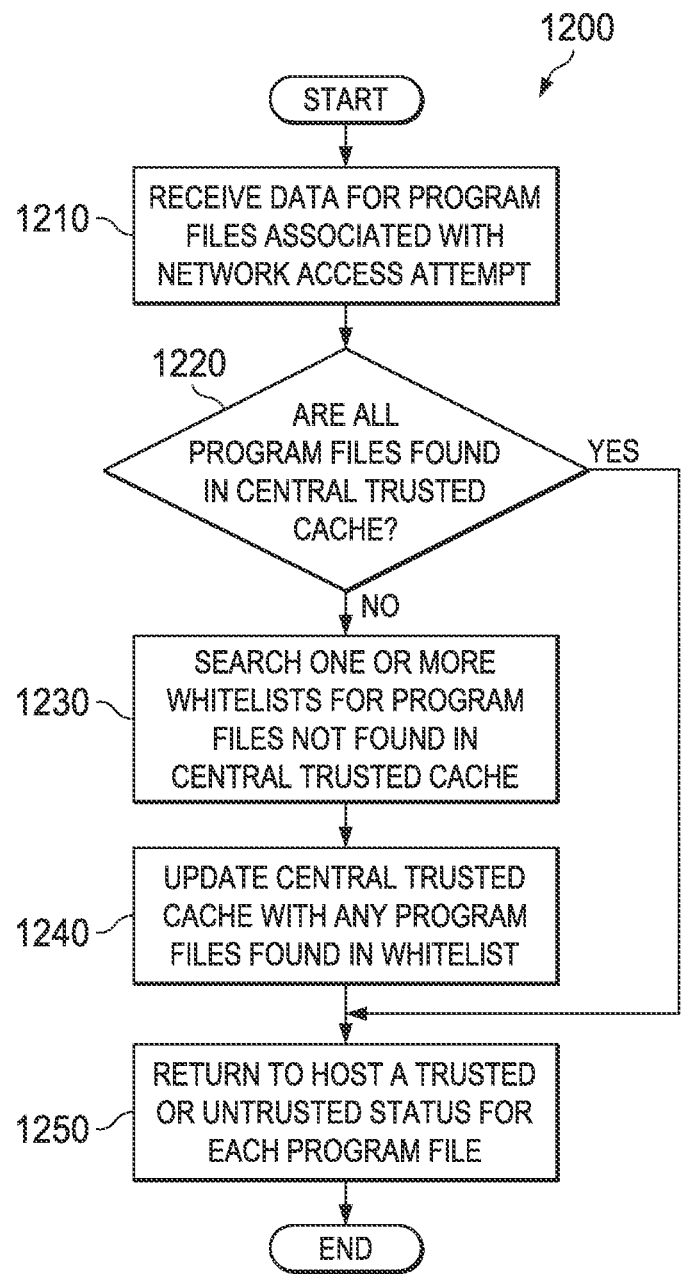
FIG. 12 is a simplified flowchart illustrating a series of example steps associated with another embodiment of a trust determination flow of the system in accordance with the present disclosure.

With reference again to step 1140, if any program file associated with the network access attempt is not found in local trusted cache 1035, then flow passes to step 1145 where the central server 200 is queried for a trust determination of those program files that were not found in local trusted cache 1035, which will be further shown and described herein with reference to FIG. 12. After a trust status for each of the program files not found in local trusted cache 1135 is returned from central server 200, flow passes to step 1150 where local trusted cache 1035 is updated with program files having a trusted status.

Flow then passes to step 1155 where a query is made as to whether all program files are trusted (i.e., no program files associated with the network access attempt were determined to have an untrusted status per the query to central server 200). If all of the program files are trusted, then flow passes to step 1170 to determine whether enforcement is enabled. If enforcement is not enabled, then flow passes to step 1190 where software process 1045 is allowed network access and the intercepted packets are passed to NIC device 1070. However, if enforcement is enabled in step 1170 then policy may be evaluated in step 1175 to determine whether policy overrides the trusted status, as previously described herein. If a policy overrides the trusted status of the one or more program files, then flow passes to step 1180 where software process 1045 is blocked from network access. However, if in step 1175 the trusted status of the one or more program files is not overridden by policy, then flow passes to step 1190 where software process 1045 is allowed network access and the outgoing packets are passed to NIC device 1070.

With reference again to step 1155, if not all program files have a trusted status (i.e., at least one program file associated with the network access attempt was determined to have an untrusted status per the query to central server 200), then flow passes to step 1160 to determine whether logging is enabled. If logging is enabled, then flow passes to step 1165 to raise the event (i.e., the network access attempt) for logging, as previously described herein with reference to FIG. 7. After the event has been raised for logging, or if logging was not enabled in step 1160, then flow passes to step 1170 to determine whether enforcement is enabled. If enforcement is not enabled, the flow passes to step 1190 where the intercepted packets are passed to NIC device 1070 and software process 1045 is allowed to access the network. However, if enforcement is enabled in step 1170 then policy may be evaluated in step 1175 to determine whether any configured policy overrides the untrusted status of the one or more program files such that network access or selective network access by software process 1045 is allowed, as previously described herein with reference to FIG. 7.

If a policy has been crafted to allow selective network access by the one or more untrusted program files corresponding to software process 1045, and the intercepted packets conform to the particular policy requirements (e.g., the packets include a destination address within an allowed subnet of addresses in accordance with the policy, etc.) then flow passes to step 1190 where the intercepted packets are passed to NIC device 1070 and software process 1045 is allowed to access the network. However, if the untrusted status of the program file is not overridden by policy (i.e., policy does not allow access or no policy is applicable), then flow passes to step 1180 where the intercepted packets are not passed to NIC device 1070 and software process 1045 is blocked from network access.

Protection flow 1100 of FIG. 11 also represents a flow used for intercepting, blocking and logging activities for inbound network access attempts to host 1100. At step 1110, local protection module 1010 intercepts an inbound network access attempt from NIC device 1070. The inbound network access attempt may be, for example, a TCP listen or accept call, and may be associated with an executing software process such as software process 1045. The incoming intercepted packets are evaluated in steps 1120 through 1175, which have previously been described herein with reference to outgoing intercepted packets of a network access attempt. If the flow from steps 1120 through 1175 proceeds to step 1190 then the incoming intercepted packets are permitted to access host 1000. However, if the flow proceeds to step 1180, then the incoming intercepted packets are blocked from accessing host 1000. In one example, blocking occurs by forcing a listen or accept call to fail, and returning an error code to the caller of the listen or accept API. In addition, as previously described herein, numerous policy configurations for inbound network access attempts are possible and may be applied to inbound network access attempts. For example, if it is determined in step 1175 that a policy has been crafted to allow selected inbound network access attempts associated with one or more untrusted program files, and the incoming packets conform to the particular policy requirements (e.g., the packets have a source address within an allowed subnet of addresses in accordance with the policy applied to the untrusted program files, etc.) then flow passes to step 1190 where the incoming intercepted packets are allowed to access host 1000. In another example, if a policy was applied to a previous network access attempt (i.e., inbound or outbound) and provided for some type of blocking to be applied to subsequent network access attempts, then a process associated with a subsequent inbound network access attempt may be blocked from access or selectively allowed access to the host in accordance with that policy, even if all of its corresponding program files have a trusted status.

Turning to FIG. 12, FIG. 12 illustrates a more detailed flow of a trust determination flow 1200 corresponding to step 1145 of FIG. 11, which may be performed by software trust determination module 240 of central server 200 for program files provided by host 1000 (e.g., program files associated with an inbound or outbound network access attempt and not found in local trusted cache 1035). Flow may begin at step 1210 when host 1000 queries central server 200 for trust determination of the program files not found in local trusted cache 1035. In step 1210, central server 200 receives data (e.g., checksums for program files) via whitelist data flow 1024 for each of the program files not found in local trusted cache 1035. Flow passes to step 1220 where central trusted cache 245 may be searched for the received program file checksums. Central trusted cache 245 may be used so that the trust status of a program file can be cached for quick retrieval, not requiring a query to internal or global whitelists. If all of the program file checksums received from host 1000 are found in central trusted cache 245 in step 1220, then flow passes to step 1250 where a trusted status for each program file is returned to host 1000. However, if not all program file checksums are found in central trusted cache 245 in step 1220 then flow passes to step 1230 and further evaluation is performed.

In step 1230, one or more global whitelists, such as global whitelist 165 shown in FIG. 1, and/or one or more internal whitelists, such as internal whitelist 133 shown in FIG. 1, may be searched for each of the program files not found in central trusted cache 245. In one embodiment, checksums are used in whitelists to identify program files and, therefore, the checksums provided to central server 200 in step 1210 are used to search the whitelists. If a program file checksum is found on a whitelist, then the trust status of the corresponding program file is defined as trusted, but if a program file checksum is not found on any of the whitelists, then the trust status of the corresponding program file is defined as untrusted. After the whitelists have been searched, flow passes to step 1240 where central trusted cache 245 is updated with any program files having a trusted status (i.e., found on one of the internal and/or external whitelists). After central trusted cache 245 is updated, flow passes to step 1250 to return the trust status (i.e., untrusted or trusted) of each program file to host 1000.

It will be apparent that the embodiment shown and described in FIGS. 10-12, could be modified in numerous ways to enhance the system for local protection against malicious software. For example, logic may be included in modules of host 1000 or central server 200 providing for evaluation of heuristic conditions (e.g., program file owner, modification date, creation date, program file attribute, etc.)

of a software program file that has been determined to have an untrusted status, as previously described herein with reference to FIGS. 5 and 6. If one or more predefined conditions exist, then the program file may be promoted to a trusted status. If no predefined condition applies to the program file, however, then the untrusted status persists and the program file may be defined as untrusted. Additional logic may also be included to evaluate blacklists in addition to whitelists, as previously described herein.

It will also be appreciated that the various embodiments of the system could be implemented using alternative host configurations. For example, the embodiments with untrusted software inventories have been shown and described being implemented in a network with hosts having NDIS driver stack and API hooking configurations. The embodiments of the system without untrusted software inventories have been shown and described as being implemented in networks having NDIS driver stack host configurations. However, any of the embodiments could be implemented in networks having NDIS driver stack, API hooking, or various other host configurations (e.g., Transport Driver Interface (TDI), Unix Streams, kernel-space network stack hooking, etc.). For example, in a TDI implementation, local protection components may be implemented and function in a similar manner to those shown in FIGS. 3 and 10. In a TDI implementation, however, a local protection module may sit on top of TCP/IP protocols instead of below it.

In one alternative embodiment of a system and method for local protection against malicious software, the system may be configured to enumerate program files out of band, determine trust status of those enumerated program files, and block network access by untrusted program files using Intel® Active Management Technology (AMT), manufactured by Intel Corporation of Santa Clara, Calif. In this example embodiment, AMT may be used to perform out of band inspection of program files of a host, such as host 120a, 120b, or 120c and create a software inventory. After this enumeration has been performed, the program files in the software inventory may be evaluated to determine a trust status as described herein in this Specification, and a local and/or central untrusted software inventory may be created and updated. Using AMT, firewall rules related to any untrusted program files may then be configured in the hardware of the respective host. Specifically, filters placed on a NIC device of the host may be configured to block untrusted program files. This configuration may be performed at specified times (e.g., predetermined time intervals, whenever the untrusted software inventory is updated, on demand, etc.).

In an alternative AMT embodiment, the configuration of filters on the NIC device may be performed in real-time. Each time a network access attempt occurs, interception, determination of associated program files, and trust determination of the program files may be performed, for example, as shown and described herein with reference to the embodiments of FIGS. 10-12. The operating system may then update the AMT firewall rules if any of the associated program files are determined to be untrusted. In yet another embodiment using AMT, the enumeration of executable software may be performed out of band, one or more untrusted software inventories may be created and maintained, and blocking may occur by other embodiments (e.g., NDIS driver stack, API hooking, etc.) shown and described herein.

In another embodiment, application level filtering may be used in local protection components, such as local protection components 124a, 124b, and 124c of FIG. 1. In application level filtering, a firewall adapted to support specifying allowed and/or blocked applications, such as Windows Firewall (manufactured by Microsoft Corp. of Redmond, Calif.), may be used in conjunction with a local or central untrusted software inventory. For example, a local untrusted software inventory may be created as described herein in this Specification. After the untrusted software inventory is populated, and anytime the inventory is updated, block rules (e.g., blocking specific applications, blocking ports associated with program files, etc.) may be created for software program files identified on the untrusted software inventory and then updated in the firewall to block network access attempts associated with the untrusted software program files. Thus, when a network access attempt is associated with an executing software process mapped to one or more untrusted program files, the firewall will block the network access attempt.

In yet another embodiment, a system and method for protecting computer networks may be implemented in a virtualized environment. In this example embodiment, out of band inspections of hard disk files that support virtualized machines can be performed. A disk file of a host, such as host 120a, 120b, or 120c, may be opened from a hypervisor on which the virtual machine is running, such that all executable software can be seen and enumerated. The enumerated software program files can be evaluated to determine a trust status as described herein in this Specification, and an untrusted software inventory can be created and maintained. The hypervisor may also be used to filter network access attempts such that inbound and outbound network access attempts associated with untrusted software program files can be blocked. This embodiment may be deployed in a data center or virtual desktop interface (VDI) environment. In an alternative embodiment, once the untrusted software inventory is created using out of band inspections of virtual machine disk files, enforcement may be performed using other techniques described herein in this Specification (e.g., NDIS stack, API hooking, etc.).

Software for achieving the operations outlined herein can be provided at various locations (e.g., the corporate IT headquarters, end user computers, distributed servers in a cloud, etc.). In other embodiments, this software could be received or downloaded from a web server (e.g., in the context of purchasing individual end-user licenses for separate networks, devices, servers, etc.) in order to provide this system for local protection against malicious software. In one example implementation, this software is resident in one or more computers sought to be protected from a security attack (or protected from unwanted or unauthorized manipulations of data).

In other examples, the software of the system for local protection against malicious software could involve a proprietary element (e.g., as part of a network security solution with McAfee® Application Control software, McAfee® Change Control software, McAfee® ePolicy Orchestrator software, McAfee® Policy Auditor software, McAfee® Artemis Technology software, McAfee® Host Intrusion Prevention software, McAfee® VirusScan software, etc.), which could be provided in (or be proximate to) these identified elements, or be provided in any other device, server, network appliance, console, firewall, switch, router, information technology (IT) device, distributed server, etc., or be provided as a complementary solution (e.g., in conjunction with a firewall), or provisioned somewhere in the network.

In an example local network 110 as shown in FIG. 1, host 120 and central server 130 are computers or computing devices that facilitate protecting computer networks against malicious software. As used herein in this Specification, the terms 'computer' and 'computing device' are meant to encompass any personal computers, network appliances, routers, switches, gateways, processors, servers, load balancers, firewalls, or any other suitable device, component, element, or object operable to affect or process electronic information in a network environment. Moreover, this computer and computing device may include any suitable hardware, software, components, modules, interfaces, or objects that facilitate the operations thereof. This may be inclusive of appropriate algorithms and communication protocols that allow for the effective protection and communication of data.

In certain example implementations, the activities involved in protecting computer networks against malicious software outlined herein may be implemented in software. This could be inclusive of software provided in central server 130 (e.g., central protection components 135) and hosts 120 (e.g., local protection components 124). These components, elements and/or modules can cooperate with each other in order to perform activities to provide local protection against malicious software such as botnets, as discussed herein. In other embodiments, these features may be provided external to these elements, included in other devices to achieve these intended functionalities, or consolidated in any appropriate manner. For example, the protection activities could be further localized in hosts 120 or further centralized in central server 130, and some of the illustrated processors may be removed, or otherwise consolidated to accommodate the particular system configuration. In a general sense, the arrangement depicted in FIG. 1 may be more logical in its representation, whereas a physical architecture may include various permutations/combinations/hybrids of these components, elements, and modules.

All of these elements (hosts 120 and central server 130) include software (or reciprocating software) that can coordinate, manage, or otherwise cooperate in order to achieve the protection activities, including trust determination, logging, and enforcement, as outlined herein. In still other embodiments, one or all of these elements may include any suitable algorithms, hardware, software, components, modules, interfaces, or objects that facilitate the operations thereof. In the implementation involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), with the tangible media being inclusive of non-transitory media. In some of these instances, one or more memory elements (as shown in various FIGURES including FIGS. 1, 2, 3, 8, and 10) can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors (as shown in FIGS. 2, 3, 8 and 10) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Any of these elements (e.g., a computer, a host, a server, a distributed server, etc.) can include memory elements for storing information to be used in achieving the protection activities as outlined herein. Additionally, each of these devices may include a processor that can execute software or an algorithm to perform the protection activities as discussed in this Specification. These devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., logged events database, central untrusted software inventory, local untrusted software inventory, internal whitelist, policy database, process traffic mapping database, checksum cache, local trusted cache, central trusted cache, etc.) should be construed as being encompassed within the broad term 'memory element.' Similarly, any of the potential processing elements, modules, and machines described in this Specification should be construed as being encompassed within the broad term 'processor.' Each of the computers, hosts, servers, distributed servers, etc. may also include suitable interfaces for receiving, transmitting, and/or otherwise communicating data or information in a network environment.

Note that with the examples provided herein, interaction may be described in terms of two, three, four, or more network components. However, this has been done for purposes of clarity and example only. It should be appreciated that the system for local protection against malicious software can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of components or network elements. Therefore, it should also be appreciated that the system of FIG. 1 (and its teachings) is readily scalable. The system can accommodate a large number of components, as well as more complicated or sophisticated arrangements and configurations. Accordingly, the examples provided should not limit the scope or inhibit the broad teachings of the system for local protection as potentially applied to various other architectures.

It is also important to note that the operations described with reference to the preceding FIGURES illustrate only some of the possible scenarios that may be executed by, or within, the system for local protection against malicious software. Some of these operations may be deleted or removed where appropriate, or these operations may be modified or changed considerably without departing from the scope of the discussed concepts. In addition, the timing of these operations and various steps may be altered considerably and still achieve the results taught in this disclosure. For example, trust determination processing may evaluate internal whitelists prior to global or external whitelists. Thus, the preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. One or more non-transitory machine readable media that includes code for execution and when executed by one or more processors is operable to perform operations comprising:

intercepting, on a computing device, a network access attempt associated with a process executing on the computing device;

determining a plurality of software program files mapped to the process, wherein at least one software program file of the plurality of software program files is an executable file and at least one other software program file of the plurality of software program files is a library module loaded by the process;

determining trust statuses of at least the executable file and the library module;

determining whether the network access attempt is permitted based, at least in part, on the trust statuses of the executable file and the library module; and performing an action if the network access attempt is not permitted, wherein if one of the software program files is determined to have an untrusted status, the network access attempt is permitted if a destination address of the network access attempt is contained in a set of allowed destination addresses indicated by a network access policy associated with the one of the software program files.

2. The one or more non-transitory machine readable media of claim 1, wherein the network access attempt is determined not to be permitted if no policy overrides the untrusted status.

3. The one or more non-transitory machine readable media of claim 2, wherein the trust status of a particular software program file of the plurality of software program files is defined as untrusted if the particular software program file is not identified in a whitelist.

4. The one or more non-transitory machine readable media of claim 1, the one or more processors being operable to perform further operations comprising:

searching a local cache that identifies trusted software program files, to determine a trust status of each of the plurality of software program files;

querying a central server for the trust status of each software program file not identified by the local cache; and updating the local cache with identifications of any software program files determined to be trusted by the central server.

5. The one or more non-transitory machine readable media of claim 1, wherein the performing the action includes blocking the network access attempt when the network access attempt is determined not to be permitted.

6. The one or more non-transitory machine readable media of claim 1, wherein at least one network hook, loaded into the process, is to intercept an application programming interface (API) associated with the network access attempt.

7. The one or more non-transitory machine readable media of claim 1, wherein the network access attempt is one of an outbound network access attempt from the process or an inbound network access attempt to the process.

8. The one or more non-transitory machine readable media of claim 1, the one or more processors being operable to perform further operations comprising:

using an operating system application programming interface to determine the plurality of software program files mapped to the process.

9. The one or more non-transitory machine readable media of claim 1, the one or more processors being operable to perform further operations comprising:

responsive to determining the one of the software program files has the untrusted status, evaluating the network access policy to determine whether the network access policy overrides the untrusted status; and applying the network access policy to the network access attempt if the network access policy is determined to override the untrusted status.

10. The one or more non-transitory machine readable media of claim 1, wherein the performing the action includes logging information related to the network access attempt if the trust status of at least one of the plurality of software program files is determined to be untrusted.

11. An apparatus, comprising:

a protection module; and one or more processors operable to execute instructions associated with the protection module, to cause the one or more processors to:

intercept, on a computing device, a network access attempt associated with a process executing on the computing device;

determine a plurality of software program files mapped to the process, wherein at least one software program file of the plurality of software program files is an executable file and at least one other software program file of the plurality of software program files is a library module loaded by the process;

determine trust statuses of at least the executable file and the library module;

determine whether the network access attempt is permitted based, at least in part, on the trust statuses of the executable file and the library module; and perform an action if the network access attempt is not permitted, wherein if one of the software program files is determined to have an untrusted status, the network access attempt is permitted if a destination address of the network access attempt is contained in a set of allowed destination addresses indicated by a network access policy associated with the one of the software program files.

12. The apparatus of claim 11, wherein the performing the action includes blocking the network access attempt when the network access attempt is determined not to be permitted.

13. The apparatus of claim 11, wherein at least one network hook, loaded into the process, is to intercept an application programming interface (API) associated with the network access attempt.

14. The apparatus of claim 11, the one or more processors being operable to execute further instructions associated with the protection module, to cause the one or more processors to:

use an operating system application programming interface to determine the plurality of software program files mapped to the process.

15. The apparatus of claim 11, wherein the performing the action includes logging information related to the network access attempt if the trust status of at least one of the plurality of software program files is determined to be untrusted.

16. A method comprising:
  intercepting, on a computing device, a network access attempt associated with
  a process executing on the computing device;
  determining a plurality of software program files mapped to the process, wherein at least one software program file of the plurality of software program files is an executable file and at least one other software program file of the plurality of software program files is a library module loaded by the process;
  determining trust statuses of at least the executable file and the library module;
  determining whether the network access attempt is permitted based, at least in part, on the trust statuses of the executable file and the library module; and
  performing an action if the network access attempt is not permitted,
wherein if one of the software program files is determined to have an untrusted status, the network access attempt is permitted if a destination address of the network access attempt is contained in a set of allowed destination addresses indicated by a network access policy associated with the one of the software program files.

17. The method of claim 16, wherein the performing the action includes blocking the network access attempt when the network access attempt is determined not to be permitted.

18. The method of claim 16, wherein at least one network hook, loaded into the process, is to intercept an application programming interface (API) associated with the network access attempt.

19. The method of claim 16, further comprising: using an operating system application programming interface to determine the plurality of software program files mapped to the process.

* * * * *